(12) United States Patent
Mickols

(10) Patent No.: US 6,337,018 B1
(45) Date of Patent: Jan. 8, 2002

(54) COMPOSITE MEMBRANE AND METHOD FOR MAKING THE SAME

(75) Inventor: William E. Mickols, Chanhassen, MN (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/550,527

(22) Filed: Apr. 17, 2000

(51) Int. Cl.$^7$ ............................................... B01D 71/56
(52) U.S. Cl. ............. 210/500.38; 210/490; 210/500.27; 264/48; 264/49; 427/244
(58) Field of Search ........................... 210/490, 500.38, 210/500.37, 500.27, 500.23; 264/48, 49; 427/244

(56) References Cited

U.S. PATENT DOCUMENTS

| | | | |
|---|---|---|---|
| 2,648,696 A | 8/1953 | Whetstone | 260/461 |
| 4,233,434 A | * 11/1980 | Kraus et al. | |
| 4,242,208 A | 12/1980 | Kawaguchi et al. | 210/654 |
| 4,277,344 A | * 7/1981 | Cadotte | |
| 4,758,343 A | 7/1988 | Sasaki et al. | 210/500.28 |
| 4,765,897 A | 8/1988 | Cadotte et al. | 210/500.23 |
| 4,950,404 A | 8/1990 | Chau | 210/500.27 |
| 4,983,291 A | * 1/1991 | Chau et al. | |
| 5,254,261 A | * 10/1993 | Tomaschke et al. | |
| 5,271,843 A | * 12/1993 | Chau et al. | |
| 5,614,099 A | 3/1997 | Hirose et al. | 210/653 |
| 5,733,602 A | 3/1998 | Hirose et al. | 427/245 |
| 5,755,964 A | 5/1998 | Mickols | 210/500.37 |
| 5,843,351 A | 12/1998 | Hirose et al. | 264/45.1 |
| 5,876,602 A | 3/1999 | Jons et al. | 210/500.38 |
| 5,989,426 A | 11/1999 | Hirose et al. | 210/500.38 |
| 6,024,873 A | 2/2000 | Hirose et al. | 210/500.38 |

FOREIGN PATENT DOCUMENTS

| | | |
|---|---|---|
| EP | 0 474 370 A1 | 3/1992 |
| JP | 271847-1988 | 10/1988 |
| JP | H3-80049 | 12/1991 |

OTHER PUBLICATIONS

Corbridge, D.E.C., *Studies in Inorganic Chemistry 6, Phosphorus, An Outline of its Chemistry, Biochemistry and Technology* (Third Edition), Elsevier, "Phosphorus—Carbon Compounds", Chapter 4, pp. 209–212, 1985.

Derwent Abstract, JP2000015067A, Manufacture of Composite Semipermeable Membrane for Recovery of Electrode Deposition Paints and Pure Water for Washing Semiconductor, etc. with available selected translated excerpts from patent.

* cited by examiner

Primary Examiner—Ana Fortuna
(74) Attorney, Agent, or Firm—Edward W. Black

(57) ABSTRACT

A composite membrane and method for making the same, comprising a porous support and a crosslinked polyamide surface. The subject membrane provides improved flux and/or rejection rates. The subject membrane is further capable of operating at lower operating pressures. The subject method includes reacting a polyfunctional amine with a polyfunctional acyl halide to form a polyamide. The method includes the step of contacting a phosphorous containing compound with the polyfunctional acyl halide prior to and/or during the reaction between the polyfunctional acyl halide and a polyfunctional amine. The subject process is easily adapted to commercial scale manufacturing processes and is particularly suited for making nanofiltration and reverse osmosis composite membranes.

30 Claims, No Drawings

COMPOSITE MEMBRANE AND METHOD FOR MAKING THE SAME

BACKGROUND OF THE INVENTION

Reverse osmosis and nanofiltration membranes are used to separate dissolved or dispersed materials from feed streams, i.e., to separate a solute from a solvent or dispersing medium. The separation process typically involves bringing an aqueous feed solution into contact with one surface of the membrane under pressure so as to effect permeation of the aqueous phase through the membrane while permeation of the dissolved or dispersed materials is prevented.

Both reverse osmosis and nanofiltration membranes typically include a thin film discriminating layer fixed to a porous support, collectively referred to as a "composite membrane". Ultrafiltration and microfiltration membranes may also have a composite arrangement. The support provides physical strength but offers little resistance to flow due to its porosity. On the other hand, the discriminating layer is less porous and provides for the rejection of the dissolved or dispersed materials. Therefore, it is generally the discriminating layer which determines the "rejection rate", i.e., the percentage of the particular dissolved material (i.e., solute) that is rejected, and the "flux" i.e., the flow rate per unit area at which the solvent passes through the membrane.

Reverse osmosis membranes and nanofiltration membranes vary from each other with respect to their degree of impermeability to different ions and organic compounds. Reverse osmosis membranes are relatively impermeable to virtually all ions, including sodium and chlorine ions. Therefore, reverse osmosis membranes are widely used for the desalination of brackish water or seawater to provide relatively non-salty water for industrial, commercial, or domestic use because the rejection rate of sodium and chlorine ions for reverse osmosis membranes is usually from about 95 to about 100 percent.

Nanofiltration membranes are usually more specific for the rejection of ions. Generally, nanofiltration membranes reject divalent ions, including radium, magnesium, calcium, sulfate, and carbonate. In addition, nanofiltration membranes are generally impermeable to organic compounds having molecular weights above about 200 Daltons. Additionally, nanofiltration membranes generally have higher fluxes at comparable fluxes than reverse osmosis membranes. These characteristics render nanofiltration membranes useful in such diverse applications as the "softening" of water and the removal of pesticides from water. As an example, nanofiltration membranes generally have a sodium chloride rejection rate of from about 0 to about 95 percent but have a relatively high rejection rate for salts such as magnesium sulfate and in some cases organic compounds such as atrazine.

Among particularly useful membranes for reverse osmosis and nanofiltration applications are those in which the discriminating layer is a polyamide. The polyamide discriminating layer for reverse osmosis membranes is often obtained by an interfacial polycondensation reaction between a polyfunctional amine and a polyfunctional acyl halide as described in, for example, U.S. Pat. No. 4,277,344, which is incorporated herein by reference. In contrast to reverse osmosis membranes, the polyamide discriminating layer for nanofiltration membranes is typically obtained via an interfacial polymerization between a piperazine or an amine substituted piperidine or cyclohexane and a polyfunctional acyl halide as described in U.S. Pat. Nos. 4,769,148 and 4,859,384. Another way of obtaining polyamide discriminating layers suitable for nanofiltration is via the methods described in, for example, U.S. Pat. Nos. 4,765,897; 4,812,270; and 4,824,574. These patents describe changing a reverse osmosis membrane, such as those of U.S. Pat. No. 4,277,344, into a nanofiltration membrane.

Composite polyamide membranes are typically prepared by coating a porous support with a polyfunctional amine, most commonly coated from an aqueous solution. Although aqueous solutions are preferred, non-aqueous solutions may be utilized, such as acetyl nitrile and dimethylformamide (DMF). A polyfunctional acyl halide is subsequently coated on the support, typically from an organic solution. Although no specific order of addition is necessarily required, the aqueous amine solution is typically first coated on the porous support followed by the organic acyl halide solution. Although one or both of the polyfunctional amine and acyl halide may be applied to the porous support from a solution, they may alternatively be applied by other means such as by vapor deposition.

Means for improving the performance of membranes by the addition of constituents to the aqueous amine and/or organic acyl halide solutions are described in the literature. For example, U.S. Pat. No. 4,950,404, issued to Chau, describes a method for increasing flux of a composite membrane by adding a polar aprotic solvent and an optional acid acceptor to the aqueous amine solution prior to interfacially polymerizing the amine with an polycarboxylic acid halide. Similarly, U.S. Pat. No. 5,989,426 to Hirose et al. describes the addition of selected alcohols, ethers, ketones, esters, halogenated hydrocarbons, nitrogen-containing compounds and sulfur-containing compounds having a solubility parameter of 8 to 14 $(cal/cm^3)^{1/2}$ to either the aqueous amine solution or organic acid halide solution prior to interfacial polymerization.

Methods of improving membrane preformance by post-treatment are also known. For example, U.S. Pat. No. 5,876,602 to Jons et al. describes treating a polyamide composite membrane with an aqueous chlorinating agent to improve flux, lower salt passage, and/or increase membrane stability to base. U.S. Pat. No. 5,755,964 to Mickols discloses a process wherein the polyamide discriminating layer is treated with ammonia or selected amines, e.g., butylamine, cyclohexylamine, and 1,6 hexane diamine. U.S. Pat. No. 4,765,897 to Cadotte discloses the post treatment of a membrane with a strong mineral acid followed by treatment with a rejection enhancing agent. U.S. Pat. Nos. 4,765,897; 5,876,602 and 5,755,964 are incorporated herein by reference.

Membranes having higher flux (i.e., flow rate per unit area) at standard operating pressures, or which are capable of maintaining flux at relatively lower operating pressures are desired. Moreover, membranes having higher rejection rates while achieving improved flux and/or lower pressure requirements are also desired. Methods for making such membranes, particularly those readily adaptable to commercial scale membrane fabrication are further desired.

SUMMARY OF THE INVENTION

The present invention provides an improved composite membrane and method for making the same including the non-sequential steps of coating a porous support with: (i) a solution containing a polyfunctional amine and (ii) a solution containing a polyfunctional acyl halide, wherein the polyfunctional amine and polyfunctional acid halide are contacted with each other and react to form a polyamide layer on the porous support. The method includes the step of contacting a phosphorous containing compound with the polyfunctional acyl halide prior to and/or during the reaction between the polyfunctional acyl halide and polyfunctional amine.

An object of the present invention is to provide improved membranes having higher flux and/or rejection. A further object of the present invention is to provide membranes capable of operating at relatively lower pressures while still providing a given flux and/or rejection. Still another object of the present invention is to provide methods for making such membranes, including methods which are readily adaptable to commercial scale membrane manufacturing. The subject method is particularly suited for making nanofiltration and reverse osmosis membranes.

DETAILED DESCRIPTION OF THE INVENTION

Composite membranes of the present invention are prepared by coating a microporous support (also referred to as "porous support") with a polyfunctional amine (also referred to as "amine" and "polyamine") and polyfunctional acyl halide (also referred to as "acyl halide"). Although the coating steps can be "non-sequential", i.e., follow no specific order, the amine is preferably coated on the support first followed by the acyl halide. As will be discussed below, the amine is typically coated from an aqueaus solution whereas the acyl halide is typically coated from an organic solution.

The polyfunctional amine monomer may have primary or secondary amino groups and may be aromatic (e.g., m-phenylenediamine, p-phenyenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris(2-diaminoethyl)amine). Examples of preferred polyamine species include primary aromatic amines having two or three amino groups, most especially m-phenylene diamine, and secondary aliphatic amines having two amino groups, most especially piperazine. The polyamine is typically applied to the microprous support as a solution in water. The aqueous solution most commonly contains from about 0.1 to about 20 weight volume percent and more preferably from about 0.5 to about 6 weight percent polyamine. Once coated on the microporous support, excess aqueous polyamine solution may be optionally removed. The polyamine solution need not be aqueous but is preferrably immicible with the non-polar organic solvent described below.

As previously indicated, the monomeric polyfunctional acyl halide is preferably coated from a non-polar organic solvent, although the polyfunctional acyl halide may be delivered from a vapor phase (for polyacyl halides having sufficient vapor pressure). The polyfunctional acyl halides are preferably aromatic in nature and contain at least two and preferably three acyl halide groups per molecule. Because of their lower cost and greater availablity, chlorides are generally preferred over the corresponding bromides or iodides. One preferred polyfunctional acyl halide is trimesoyl chloride (TMC). The polyfunctional acyl halide is typically dissolved in a non-polar organic solvent in a range of from 0.01 to 10.0 percent by weight volume (more preferably 0.05 to 3 weight volume percent), and delivered as part of a continuous coating operation. Suitable non-polar organic solvents are those which are capable of dissolving polyfunctional acyl halides and which are immiscible with water. Preferred solvents include those which do not pose a threat to the ozone layer and yet are sufficiendy safe in terms of their flashpoints and flammability to undergo routine processing without having to undertake extreme precautions. Higher boiling hydrocarbons, i.e., those with boiling points greater than about 90° C. such as $C_8$–$C_{14}$ hydrocarbons and mixtures thereof have more favorable flashpoints than their $C_5$–$C_7$ counterparts but they are less volatile.

Once brought into contact with one another, the polyfunctional acyl halide and polyfunctional amine react at their surface interface to form a crosslinked polyamide discriminating layer. The reaction time is typically less than one second but contact time is often from one to sixty seconds, after which excess liquid may optionally be removed, e.g., by way of an air knife, water baths and/or a dryer. The removal of the excess water and/or organic solvent is most conveniently achieved by drying at elevated temperatures, e.g., from about 40° C. to about 120° C., although air drying at ambient temperatures may be used.

While not wishing to be bound by theory, it is believed that the subject phosphorous containing compounds are capable of forming "associations" with the polyfunctional acyl halide when utilized according to the subject method. It is believed that the formation of such associations is important in achieving the aforementioned improvements in membrane performance. The term "associations" is intended to include covalent bonds, complexes, weak bonds and other interactions which form between the phosphorous containing compounds and the polyfunctional acyl halide prior to or during the polymerization of the polyfunctional amine and acyl halide monomers, as will be described in more detail below. More particularly, in order to provide the full benefit of the subject invention, it is believed that it is important to form a complex between the phosphorous containing compound and the acyl halide prior to or during the reaction between the acyl halide and amine. Thus, the timing and manner of addition of the phosphorous containing compound are believed to be important. For example, the benefit of the subject invention is not achieved by the sole addition of a phosphorous containing compound (e.g., as described in U.S. Pat. No. 4,765,897 with respect to phosphoric acid) after the acyl halide and amine have completely reacted. Moreover, the benefit of the invention is not achieved if the phosphorous containing compound is contacted with the acyl halide in a manner which does not permit complex formation therebetween. For example, if the particular phosphorous containing compound is insufficiently soluble or dispersable within the acyl halide solution, it is unlikely that the full benefits of the subject invention will be realized as an insufficient degree of complexation will occur. Consequently, preferred embodiments of the invention utilize phoshorous containing compounds which are substantially soluble in the acyl halide solution and which readily form complexes with acyl halides, i.e., have an energy of interaction with the polyfunctional acyl halide of greater than about 4.0 kcal/Mole.

In preferred embodiments, the phosphorous containing compounds are directly added to the acyl halide solution prior to contacting (e.g. coating) the acyl halide and amine solutions, thereby permitting sufficient opportunity for the formation of a complex prior to reaction between the amine and acyl halide.

In a less preferred alternative embodiment, the phosphorous containing compound(s) may be contacted with the acyl halide solution (e.g., via spray) while the acyl halide solution is contacted with the polyfunctional amine solution. In this embodiment, the phosphorous containing compound is essentially contacted with the acyl halide solution simultaneously with the step of contacting the acyl halide and amine solution. In this embodiment the acyl halide and phosphorous containing compound have a much shorter time period to form a complex prior to complete reaction between the acyl halide and amine. Alternatively, the phosphorous containing compound may be contacted with the acyl halide solution after the acyl halide and amine solutions have been contacted but prior to complete reaction therebetween. As previously indicated, this embodiment provides a much shorter time period for complex formation to occur prior to complete reaction between the acyl halide and amine.

In a still less preferred embodiment, the phosphorous containing compound may be added to the amine solution prior to contacting the amine and acyl halide solutions. This approach is less preferred as it is difficult to deliver the phosphorous containing compound from the amine solution to the acyl halide in a manner which allows suitable complex formation prior to completion of the reaction between the acyl halide and amine. However, one remedial approach includes the formation of a high internal phase emulsion of the phosphorous containing compound within the amine solution, thereby providing a relatively uniform delivery of the phosphorous containing compound to the acyl halide during reaction between the acyl halide and amine. Formation of high internal phase emulsions are well known and are described in U.S. Pat. No. 5,977,194 which is incorporated herein by reference. Other suitable approaches involve the selection of phosphorous containing compounds having sufficient solubility in the amine solution (e.g., aqueous solutions) in order to be uniformly dispersed, while simultaneously being sufficiently soluble in the acyl halide solution (e.g., organic solution) such that a sufficient amount of phosphorous containing compound is provided to the acyl halide prior to completion of reaction between the acyl halide and amine.

One means for determining whether the subject phosphorous containing compound(s) have been successfully contacted with the acyl halide in accordance to the subject method is the presence of a "detectable quantity" of "retained" phosphorous in the polyamide membrane. The term "retained" phosphorous is intended to mean that phosphorous which remains associated (e.g., covalently bonded, complexed, weakly bound, etc.) with the polyamide membrane after being subjected to cleaning with pure water, e.g. passing pure water across the polyamide membrane at 25° C. for 24 hours at a pressure of about 70 pounds per square inch. Such cleaning removes transient sources of phosphorous which may be initially present but which do not contribute to the subject invention. For example, it is well known that phosphoric acid may be added to the amine solution as a pH buffer. In such embodiments some portion of the phosphoric acid may be present on the initial resulting membrane; however, as the phosphoric acid is not contacted with the acyl halide in manner which permits complexation, the phosphoric acid is not retained and is washed away from the membrane upon use or cleaning. Although such prior art uses of phosphoric acid may be used in conjunction with the subject invention, such prior art embodiments do not result in "retained" phosphorous as described above, nor the degree of improved membrane performance attributed to the subject invention.

The term "detectable quantity" is intended to mean a sufficient quantity of retained phosphorous is present such that it may be measured, identified or otherwise detected by quantitative or qualitative analysis. Detection of phosphorous in membranes can be made by way of any suitable analytical technique; however due to the relatively low quantities of phosphorous containing compounds utilized, relatively sensitive analytical techniques are preferred, e.g., X-ray fluorescence, (XRF), secondary ion mass spectroscopy, IR, and colorimetric analysis of the fully combusted polyamide. One specific X-ray fluorescence detection methodology involves extracting a portion (e.g., 100 mg) of the polyamide polymer from the porous support, e.g., boiling the membrane in water for about 30 minutes followed by dissolving the porous support with an appropriate solvent, e.g., methylene chloride, and subsequently extensively extracting the polyamide in the same solvent. The polyamide may then be isolated and pressed into a 13 mm diameter disk using a die and an hydraulic press (10,000 lbs. load). The resulting disk may be placed between two layers of polypropylene sample support film (6.0 micron thickness) and attached to a Chemplex 30 mm diameter XRF sample cup using a standard support ring. The sample can be measured in a plastic insert with a Pb mask. Measurements can be obtained on both sides of the disk and averaged together. Once prepared, the sample can be analyzed with a Philips PW1480 wavelength dispersive X-ray fluorescence spectrometer equipped with a scandium anode 3 KW X-ray tube. For measurement of Phosphorous, K alpha X-ray intensity the instrument can be operated under the following conditions: 50 kV, 50 mA, germanium crystal (2d=6.532 angstroms), gas flow proportional detector (argon/methane), upper and lower discriminator level 80/25, He purge. The Phosphorous K alpha peak can be measured at a 2 theta angle of 141.035 and backgrounds can be measured at + and − offsets of 1.5. Peak and background measurements are commonly taken for 10 seconds each.

In preferred embodiments, the subject polyamide composite membrane includes at least about 1 microgram (and more preferably at least 5 micrograms, even more preferably 15 micrograms and in some embodiments at least 30 micrograms) of "retained" phosphorous per gram of polyamide. As indicated, the retained phosphorous is believed to be a result of the formation of a complex between the phosphorous containing compound and the acyl halide. Although dependent upon the relative density of the polyamide layer, most membranes of the subject invention will include at least 0.02 micrograms of phosphorous per square meter of membrane, but more commonly more than about 1 microgram of phosphorous per square meter of membrane.

The phosphorous containing compounds of the present invention are not particularly limited and different species of compounds may be used in combination. However, preferred species are non-pyrophoric, sufficiently stable in air and water (i.e., the species do not decompose, degrade or significantly react with water or air within the time period of the subject method), and have suitable industrial hygiene properties, e.g., do not pose significant environmental hazards, do not require expansive handling requirements, do not pose significant safety concerns, etc. The subject phosphorous containing compounds are preferably "substantially soluble" in the organic solutions as described herein. The term "substantially soluble" is intended to mean that a sufficient quantity of the phosphorous containing compound dissolves in the solution to result in a final membrane having improved flux, rejection and/or lower operating pressure as compared to an identical membrane prepared without the subject phosphorous containing compound. An additional indicia that the phosphorous containing compound is "substantially soluble" is the presence of a detectable quantity of retained phosphorous in the polyamide layer. When used at effective concentrations the subject phosphorous containing compounds preferably dissolve and form a single homogeneous phase within the organic solutions previously described. Preferred phosphorous containing compounds have a solubility parameter of from about 15 to about 26, and more preferably from 18 to 23 $J^{1/2}$ cm$^{-3/2}$.

Regardless of the means of contacting the phosphorous containing compound with the acyl halide solution, the quantity of phosphorous containing compound is preferably stoichiometrically related to the quantity of polyfunctional acyl halide. Preferred stoichiometric ratios of phosphorous containing compound to polyfunctional acyl halide range from about 1:5 to about 5:1 with 1:1 to about 3:1 being most preferred. Although preferred, stoichiometric ratios of the phosphorous containing compound are not required. When combined directly with the acyl halide solutions, the phosphorous containing compound typically comprises from about 0.001 to about 2 weight volume percent of the acyl halide solution. When utilized according to alternative embodiments as previously described, larger quantities of the phosphorous containing compound may be required.

Preferred phosphorous containing compounds are those having an energy of interaction with the polyfunctional acyl halide of greater than about 4.0 kcal/Mole, and more preferably greater than about 5.0 kcal/Mole. Said another way, the energy required to disassociate the complex formed between the phosphorous containing compound and the polyfunctional acyl halide is greater than about 4.0 kcals/Mole, and more preferably greater than about 5.0 kcal/Mole.

A preferred class of phosphorous containing compounds can be represented below by following Formula 1:

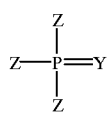

Formula 1 wherein Z is the same or different and is selected from X, O—P—(X)$_2$, P(O)—X$_2$, (P(—X))$_m$—P—X$_2$, (O—P(—X))$_m$—O—P—X$_2$, (P(O)(—X))$_m$—P(O)—X$_2$, and (O—P(O)(—X))$_m$—O—P(O)—X$_2$, wherein P is phosphorous, O is oxygen, m is an integer from 1 to 5; and Y is O (oxygen) or a non-bonded pair of electrons, as indicated in Formula 2 and 3, respectively;

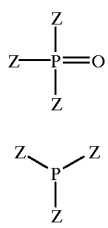

Formula 2

Formula 3 wherein X is the same or different and is selected from: R or R including oxygen linkage(s), e.g., R—O—R, O—R, etc; and R is the same or different and is selected from H (hydrogen), and/or a carbon containing moiety. The Z groups are preferably selected such that they collectively result in the phosphorous containing compound being substantially soluble in the organic solution.

The phrase "the same or different" is intended to mean that the individual groups represented by a single symbol, e.g., "R", may vary within a given compound. For example, for any given compound, one R group may be hydrogen whereas the other R groups may be butyl groups.

The term "carbon containing moiety" is intended to mean branched and unbranched acyclic groups, e.g., methyl, ethyl, propyl, isopropyl, butyl, isobutyl, pentyl, 2-pentyl, 3-pentyl, tert-butyl, etc. which may be unsubstituted or substituted (e.g., substituted with amide groups, ether groups, ester groups, sulfone groups, carbonyl groups, anhydrides, cyanide, nitrile, isocynate, urethane, beta-hydroxy ester, double and triple bonds etc.), and cyclic groups, e.g., cyclo pentyl, cyclo hexyl, aromatics, e.g., phenyl, heterocyclic, etc., which may be unsubstituted or substituted, (e.g., substituted with methyl, ethyl, propyl, hydroxyl, amide, ether, sulfone, carbonyl, ester, etc.). Cyclo moieties may be linked to the phosphorous atom by way of an aliphatic liking group, e.g., methyl, ethyl, etc.

Preferred carbon containing moieties include unsubstituted, branched or unbranched $C_1$–$C_{12}$ groups, and more preferably $C_1$–$C_8$ aliphatic groups such as: methyl, ethyl, propyl, isopropyl, butyl, 2-methyl butyl, 3-methyl butyl, 2-ethyl butyl, pentyl, hexyl, etc. Additionally, preferred moieties include phenyl groups.

Examples of preferred sub-classes of compounds are represented by Formulae 4–9.

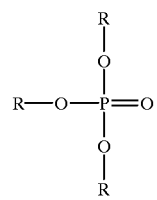

Formula 4

Formula 5

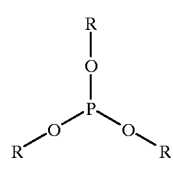

Formula 6

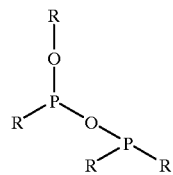

Formula 7

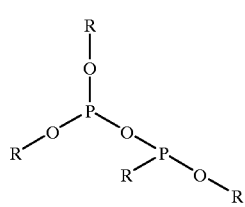

Formula 8

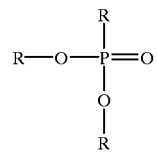

Formula 9 wherein R, P and O are as previously defined. Such phosphorous containing compounds are commercially available or can be synthesized using known methodologies, see for example U.S. Pat. No. 2,648,696 to Whetstone, incorporated herein by reference, and Aharoni et al., *Journal of Polymer Science*, Volume 22, 2579–2599.

Examples of classes of applicable phosphorous containing compounds include: phosphates (e.g., phosphate esters), phosphites, phosphines, phosphine oxides, phosphonates, including diphosphqnates, phosphinates, phosphinites, phosphonites, pyrophosphates, pyrophosphoramides, phosphor amides, phosphorothionates including phosphoro dithionates, phosphorodithionates, phosphoro amido thionates, and phosphonothioates including phosphonodithioates. A non-comprehensive list of specific examples of each class are provided below.

Specific examples of tri-phosphates include:
tri-methyl phosphate, tri-ethyl phosphate, tri-(1-propyl) phosphate, tri-(2-propyl)phosphate, tri-(1-butyl)phosphate, tri-(2-butyl)phosphate, tri-(1-tert-butyl)phosphate, tri-(2-tert-butyl)phosphate, tri-(1-pentyl)phosphate, tri-(2-pentyl) phosphate, tri-(3-pentyl)phosphate, tri-(1-hexyl)phosphate, tri-(2-hexyl)phosphate, tri-(3-hexyl)phosphate, tri-(1-heptyl)phosphate, tri-(2-heptyl)phosphate, tri-(3-heptyl) phosphate, tri-(4-heptyl)phosphate, tri-(1-octyl)phosphate, tri-(2-octyl)phosphate, tri-(3-octyl)phosphate, tri-(4-octyl) phosphate, tri-(1-CH3(CH2)8)phosphate, tri-(2-CH3(CH2) 8) phosphate, tri-(3-CH3(CH2)8)phosphate, tri-(4-CH3 (CH2)8)phosphate, tri-(1-CH3(CH2)9)phosphate, tri-(2-CH3(CH2)9)phosphate, tri-(3-CH3(CH2)9)phosphat, tri-(4-CH3(CH2)9)phosphate, tri-(5-CH3(CH2)9)phosphate, tri-(1-CH3(CH2)10)phosphate, tri-(2-CH3(CH2)10)phosphate, tri-(3-CH3(CH2)10)phosphate, tri-(4-CH3(CH2)10) phosphate, tri-(5-CH3(CH2)10)phosphate, tri-(1-CH3(CH2) 11)phosphate, tri-(2-CH3(CH2)11)phosphate, tri-(3-CH3 (CH2)11)phosphate, tri-(4-CH3(CH2)11)phosphate, tri-(5-CH3(CH2)11)phosphate, tri-(6-CH3(CH2)11)phosphate, tri-(1-CH3(CH2)12)phosphate, tri-(2-CH3(CH2)12) phosphate, tri-(3-CH3(CH2)12)phosphate, tri-(4-CH3(CH2) 12)phosphate, tri-(5-CH3(CH2)12)phosphate, tri-(6-CH3 (CH2)12)phosphate, tri-(methyl pentyl)phosphate, tri-(ethyl pentyl)phosphate, tri-(methyl hexyl)phosphate, tri-(ethyl hexyl)phosphate, tri-(propyl hexyl)phosphate, tri-(methyl heptyl)phosphate, tri-(ethyl heptyl)phosphate, tri-(diethyl heptyl)phosphate, tri-(methyl octyl)phosphate, tri-(dimethyl octyl)phosphate, methyl di-(-ethyl)phosphate, methyl di-(1-propyl)phosphate, methyl di-(2-propyl)phosphate, methyl di-(1-butyl)phosphate, methyl di-(2-butyl)phosphate, methyl di-(1-tert-butyl)phosphate, methyl di-(2-tert-butyl) phosphate, methyl di-(1-pentyl)phosphate, methyl di-(2-pentyl)phosphate, methyl di-(3-pentyl)phosphate, methyl di-(1-hexyl)phosphate, methyl di-(2-hexyl)phosphate, methyl di-(3-hexyl)phosphate, methyl di-(1-heptyl) phosphate, methyl di-(2-heptyl)phosphate, methyl di-(3-heptyl)phosphate, methyl di-(4-heptyl)phosphate, methyl di-(1-octyl)phosphate, methyl di-(2-octyl)phosphate, methyl di-(3-octyl)phosphate, methyl di-(4-octyl)phosphate, methyl di-(1-CH3(CH2)8)phosphate, methyl di-(2-CH3(CH2)8) phosphate, methyl di-(3-CH3(CH2)8)phosphate, methyl di-(4-CH3(CH2)8)phosphate, methyl di-(1-CH3(CH2)9) phosphate, methyl di-(2-CH3(CH2)9)phosphate, methyl di-(3-CH3(CH2)9)phosphate, methyl di-(4-CH3(CH2)9) phosphate, methyl di-(5-CH3(CH2)9)phosphate, methyl di-(1-CH3(CH2)10)phosphate, methyl di-(2-CH3(CH2)10) phosphate, methyl di-(3-CH3(CH2)10)phosphate, methyl di-(4-CH3(CH2)10)phosphate, methyl di-(5-CH3(CH2)10) phosphate, methyl di-(1-CH3(CH2)11)phosphate, methyl di-(2-CH3(CH2)11)phosphate, methyl di-(3-CH3(CH2)11) phosphate, methyl di-(4-CH3(CH2)11)phosphate, methyl di-(5-CH3(CH2)11)phosphate, methyl di-(6-CH3(CH2)11) phosphate, methyl di-(1-CH3(CH2)12)phosphate, methyl di-(2-CH3(CH2)12)phosphate, methyl di-(3-CH3(CH2)12) phosphate, methyl di-(4-CH3(CH2)12)phosphate, methyl di-(5-CH3(CH2)12)phosphate, methyl di-(6-CH3(CH2)12) phosphate, ethyl di-(1-propyl)phosphate, ethyl di-(2-propyl) phosphate, ethyl di-(1-butyl)phosphate, ethyl di-(2-butyl) phosphate, ethyl di-(1-tert-butyl)phosphate, ethyl di-(2-tert-butyl)phosphate, ethyl di-(1-pentyl)phosphate, ethyl di-(2-pentyl)phosphate, ethyl di-(3-pentyl)phosphate, ethyl di-(1-hexyl)phosphate, ethyl di-(2-hexyl)phosphate, ethyl di-(3-hexyl)phosphate, ethyl di-(1-heptyl)phosphate, ethyl di-(2-heptyl)phosphate, ethyl di-(3-heptyl)phosphate, ethyl di-(4-heptyl)phosphate, ethyl di-(1-octyl)phosphate, ethyl di-(2-octyl)phosphate, ethyl di-(3-octyl)phosphate, ethyl di-(4-octyl)phosphate, ethyl di-(1-CH3(CH2)8)phosphate, ethyl di-(2-CH3(CH2)8)phosphate, ethyl di-(3-CH3(CH2)8) phosphate, ethyl di-(4-CH3(CH2)8)phosphate, ethyl di-(1-CH3(CH2)9)phosphate, ethyl di-(2-CH3(CH2)9)phosphate, ethyl di-(3-CH3(CH2)9)phosphate, ethyl di-(4-CH3(CH2) 9)phosphate, ethyl di-(5-CH3(CH2)9)phosphate, ethyl di-(1-CH3(CH2)10)phosphate, ethyl di-(2-CH3(CH2)10) phosphate, ethyl di-(3-CH3(CH2)10)phosphate, ethyl di-(4-CH3(CH2)10)phosphate, ethyl di-(5-CH3(CH2)10) phosphate, ethyl di-(1-CH3(CH2)11)phosphate, ethyl di-(2-CH3(CH2)11)phosphate, ethyl di-(3-CH3(CH2)11) phosphate, ethyl di-(4-CH 3(CH2)11)phosphate, ethyl di-(5-CH3(CH2)11)phosphate, ethyl di-(6-CH3(CH2)11) phosphate, ethyl di-(1-CH3(CH2)12)phosphate, ethyl di-(2-CH3(CH2)12)phosphate, ethyl di-(3-CH3(CH2)12) phosphate, ethyl di-(4-CH3(CH2)12)phosphate, ethyl di-(5-CH3(CH2)12)phosphate, ethyl di-(6-CH3(CH2)12) phosphate, 1-propyl di-(2-propyl)phosphate, 1-propyl di-(1-butyl)phosphate, 1-propyl di-(2-butyl)phosphate, 1-propyl di-(1-tert-butyl)phosphate, 1-propyl di-(2-tert-butyl) phosphate, 1-propyl di-(1-pentyl)phosphate, 1-propyl di-(2-pentyl)phosphate, 1-propyl di-(3-pentyl)phosphate, 1-propyl di-(1-hexyl)phosphate, 1-propyl di-(2-hexyl) phosphate, 1-propyl di-(3-hexyl)phosphate, 1-propyl di-(1-heptyl)phosphate, 1-propyl di-(2-heptyl)phosphate, 1-propyl di-(3-heptyl)phosphate, 1-propyl di-(4-heptyl) phosphate, 1-propyl di-(1-octyl)phosphate, 1-propyl di-(2-octyl)phosphate, 1-propyl di-(3-octyl)phosphate, 1-propyl di-(4-octyl)phosphate, 1-propyl di-(1-CH3(CH2)8) phosphate, 1-propyl di-(2-CH3(CH2)8)phosphate, 1-propyl di-(3-CH3(CH2)8)phosphate, 1-propyl di-(4-CH3(CH2)8) phosphate, 1-propyl di-(1-CH3(CH2)9)phosphate, 1-propyl di-(2-CH3(CH2)9)phosphate, 1-propyl di-(3-CH3(CH2)9) phosphate, 1-propyl di-(4-CH3(CH2)9)phosphate, 1-propyl di-(5-CH3(CH2)9)phosphate, 1-propyl di-(1-CH3(CH2)10) phosphate, 1-propyl di-(2-CH3(CH2)10)phosphate, 1-propyl di-(3-CH3(CH2)10)phosphate, 1-propyl di-(4-CH3(CH2)10)phosphate, 1-propyl di-(5-CH3(CH2)10) phosphate, 1-propyl di-(1-CH3(CH2)11)phosphate, 1-propyl di-(2-CH3(CH2)11)phosphate, 1-propyl di-(3-CH3 (CH2)11)phosphate, 1-propyl di-(4-CH3(CH2)11) phosphate, 1-propyl di-(5-CH3(CH2)11)phosphate, 1-propyl di-(6-CH3(CH2)11)phosphate, 1-propyl di-(1-CH3 (CH2)12)phosphate, 1-propyl di-(2-CH3(CH2)12) phosphate, 1-propyl di-(3-CH3(CH2)12)phosphate, 1-propyl di-(4-CH3(CH2)12)phosphate, 1-propyl di-(5-CH3(CH2)12)phosphate, 1-propyl di-(6-CH3(CH2)12) phosphate, 2-propyl di-(1-butyl)phosphate, 2-propyl di-(2-butyl)phosphate, 2-propyl di-(1-tert-butyl)phosphate, 2-propyl di-(2-tert-butyl)phosphate, 2-propyl di-(1-pentyl) phosphate, 2-propyl di-(2-pentyl)phosphate, 2-propyl di-(3-pentyl)phosphate, 2-propyl di-(1-hexyl)phosphate, 2-propyl di-(2-hexyl)phosphate, 2-propyl di-(3-hexyl)phosphate, 2-propyl di-(1-heptyl)phosphate, 2-propyl di-(2-heptyl) phosphate, 2-propyl di-(3-heptyl)phosphate, 2-propyl di-(4-heptyl)phosphate, 2-propyl di-(1-octyl)phosphate, 2-propyl di-(2-octyl)phosphate, 2-propyl di-(3-octyl)phosphate, 2-propyl di-(4-octyl)phosphate, 2-propyl di-(1-CH3(CH2)8) phosphate, 2-propyl di-(2-CH3(CH2)8)phosphate, 2-propyl di-(3-CH3(CH2)8)phosphate, 2-propyl di-(4-CH3(CH2)8) phosphate, 2-propyl di-(1-CH3(CH2)9)phosphate, 2-propyl di-(2-CH3(CH2)9)phosphate, 2-propyl di-(3-CH3(CH2)9) phosphate, 2-propyl di-(4-CH3(CH2)9)phosphate, 2-propyl di-(5-CH3(CH2)9)phosphate, 2-propyl di-(1-CH3(CH2)10) phosphate, 2-propyl di-(2-CH3(CH2)10)phosphate, 2-propyl di-(3-CH3(CH2)10)phosphate, 2-propyl di-(4-CH3(CH2)10)phosphate, 2-propyl di-(5-CH3(CH2)10) phosphate, 2-propyl di-(1-CH3(CH2)11)phosphate, 2-propyl di-(2-CH3(CH2)11)phosphate, 2-propyl di-(3-CH3(CH2)11)phosphate, 2-propyl di-(4-CH3(CH2)11) phosphate, 2-propyl di-(5-CH3(CH2)11)phosphate, 2-propyl di-(6-CH3(CH2)11)phosphate, 2-propyl di-(1-CH3(CH2)12)phosphate, 2-propyl di-(2-CH3(CH2)12) phosphate, 2-propyl di-(3-CH3(CH2)12)phosphate, 2-propyl di-(4-CH3(CH2)12)phosphate, 2-propyl di-(5-CH3(CH2)12)phosphate, 2-propyl di-(6-CH3(CH2)12) phosphate, butyl di-(1-tert-butyl)phosphate, butyl di-(2-tert-butyl)phosphate, butyl di-(1-pentyl)phosphate, butyl di-(2-pentyl)phosphate, butyl di-(3-pentyl)phosphate, butyl di-(1-hexyl)phosphate, butyl di-(2-hexyl)phosphate, butyl di-(3-hexyl)phosphate, butyl di-(1-heptyl)phosphate, butyl di-(2-heptyl)phosphate, butyl di-(3-heptyl)phosphate, butyl di-(4-heptyl)phosphate, butyl di-(1-octyl)phosphate, butyl di-(2-octyl)phosphate, butyl di-(3-octyl)phosphate, butyl di-(4-octyl)phosphate, butyl di-(1-CH3(CH2)8)phosphate, butyl di-(2-CH3(CH2)8)phosphate, butyl di-(3-CH3(CH2)8) phosphate, butyl di-(4-CH3(CH2)8)phosphate, butyl di-(1-CH3(CH2)9)phosphate, butyl di-(2-CH3(CH2)9)phosphate, butyl di-(3-CH3(CH2)9)phosphate, butyl di-(4-CH3(CH2)9)phosphate, butyl di-(5-CH3(CH2)9)phosphate, butyl di-(1-CH3(CH2)10)phosphate, butyl di-(2-CH3(CH2)10) phosphate, butyl di-(3-CH3(CH2)10)phosphate, butyl di-(4-CH3(CH2)10)phosphate, butyl di-(5-CH3(CH2)10) phosphate, butyl di-(1-CH3(CH2)11)phosphate, butyl di-(2-CH3(CH2)11)phosphate, butyl di-(3-CH3(CH2)11) phosphate, butyl di-(4-CH3(CH2)11)phosphate, butyl di-(5-CH3(CH2)11)phosphate, butyl di-(6-CH3(CH2)11) phosphate, butyl di-(1-CH3(CH2)12)phosphate, butyl di-(2-CH3(CH2)12)phosphate, butyl di-(3-CH3(CH2)12) phosphate, butyl di-(4-CH3(CH2)12)phosphate, butyl di-(5-CH3(CH2)12)phosphate, butyl di-(6-CH3(CH2)12) phosphate, methyl ethyl propyl phosphate, methyl ethyl butyl phosphate, methyl ethyl pentyl phosphate, methyl ethyl hexyl phosphate, methyl ethyl heptyl phosphate, methyl ethyl octyl phosphate, methyl propyl butyl phosphate, methyl propyl pentyl phosphate, methyl propyl hexyl phosphate, methyl propyl heptyl phosphate, methyl propyl octyl phosphate, methyl butyl pentyl phosphate, methyl butyl hexyl phosphate, methyl butyl heptyl phosphate, methyl butyl octyl phosphate, methyl pentyl hexyl phosphate, methyl pentyl heptyl phosphate, methyl pentyl octyl phosphate, methyl hexyl heptyl phosphate, methyl hexyl octyl phosphate, ethyl propyl butyl phosphate, ethyl propyl pentyl phosphate, ethyl propyl hexyl phosphate, ethyl propyl heptyl phosphate, ethyl propyl octyl phosphate, ethyl butyl pentyl phosphate, ethyl butyl hexyl phosphate, ethyl butyl heptyl phosphate, ethyl butyl octyl phosphate, ethyl pentyl hexyl phosphate, ethyl pentyl heptyl phosphate, ethyl pentyl octyl phosphate, ethyl hexyl heptyl phosphate, ethyl hexyl octyl phosphate, tri-phenyl phosphate, methyl di-phenyl phosphate, ethyl di-phenyl phosphate, 1 propyl di-phenyl phosphate, 2 propyl di-phenyl phosphate, 1 butyl di-phenyl phosphate, 2 butyl di-phenyl phosphate, 1 tert-butyl di-phenyl phosphate, 2 tert-butyl di-phenyl phosphate, 1 pentyl di-phenyl phosphate, 2 pentyl di-phenyl phosphate, 3 pentyl di-phenyl phosphate, 1 hexyl di-phenyl phosphate, 2 hexyl di-phenyl phosphate, 3 hexyl di-phenyl phosphate, 1 heptyl di-phenyl phosphate, 2 heptyl di-phenyl phosphate, 3 heptyl di-phenyl phosphate, 4 heptyl di-phenyl phosphate, 1 octyl di-phenyl phosphate, 2 octyl di-phenyl phosphate, 3 octyl di-phenyl phosphate, 4 octyl di-phenyl phosphate, 1 CH3(CH2)8 di-phenyl phosphate, 2 CH3(CH2)8 di-phenyl phosphate, 3 CH3(CH2)8 di-phenyl phosphate, 4 CH3(CH2)8 di-phenyl phosphate, 1 CH3(CH2)9 di-phenyl phosphate, 2 CH3(CH2)9 di-phenyl phosphate, 3 CH3(CH2)9 di-phenyl phosphate, 4 CH3(CH2)9 di-phenyl phosphate, 5 CH3(CH2)9 di-phenyl phosphate, 1 CH3(CH2)10 di-phenyl phosphate, 2 CH3(CH2)10 di-phenyl phosphate, 3 CH3(CH2)10 di-phenyl phosphate, 4 CH3(CH2)10 di-phenyl phosphate, 5 CH3(CH2)10 di-phenyl phosphate, 1 CH3(CH2)11 di-phenyl phosphate, 2 CH3(CH2)11 di-phenyl phosphate, 3 CH3(CH2)11 di-phenyl phosphate, 4 CH3(CH2)11 di-phenyl phosphate, 5 CH3(CH2)11 di-phenyl phosphate, 6 CH3(CH2)11 di-phenyl phosphate, 1 CH3(CH2)12 di-phenyl phosphate, 2 CH3(CH2)12 di-phenyl phosphate, 3 CH3(CH2)12 di-phenyl phosphate, 4 CH3(CH2)12 di-phenyl phosphate, 5 CH3(CH2)12 di-phenyl phosphate, 6 CH3(CH2)12 di-phenyl phosphate, di-methyl phenyl phosphate, di-ethyl phenyl phosphate, di-(1-propyl)phenyl phosphate, di-(2-propyl) phenyl phosphate, di-(-isopropyl)phenyl phosphate, di-(1-butyl)phenyl phosphate, di-(2-butyl)phenyl phosphate, di-(1-tert-butyl)phenyl phosphate, di-(2-tert-butyl)phenyl phosphate, di-(1-pentyl)phenyl phosphate, di-(2-pentyl) phenyl phosphate, di-(3-pentyl)phenyl phosphate, di-(1-hexyl)phenyl phosphate, di-(2-hexyl)phenyl phosphate, di-(3-hexyl)phenyl phosphate, di-(1-heptyl)phenyl phosphate, di-(2-heptyl)phenyl phosphate, di-(3-heptyl)phenyl phosphate, di-(4-heptyl)phenyl phosphate, di-(1-octyl) phenyl phosphate, di-(2-octyl)phenyl phosphate, di-(3-octyl)phenyl phosphate, di-(4-octyl)phenyl phosphate, di-(1-CH3(CH2)8)phenyl phosphate, di-(2-CH3(CH2)8) phenyl phosphate, di-(3-CH3(CH2)8)phenyl phosphate, di-(4-CH3(CH2)8)phenyl phosphate, di-(1-CH3(CH2)9) phenyl phosphate, di-(2-CH3(CH2)9)phenyl phosphate, di-(3-CH3(CH2)9)phenyl phosphate, di-(4-CH3(CH2)9) phenyl phosphate, di-(5-CH3(CH2)9)phenyl phosphate, di-(1-CH3(CH2)10)phenyl phosphate, di-(2-CH3(CH2)10) phenyl phosphate, di-(3-CH3(CH2)10)phenyl phosphate, di-(4-CH3(CH2)10)phenyl phosphate, di-(5-CH3(CH2)10) phenyl phosphate, di-(1-CH3(CH2)11)phenyl phosphate, di-(2-CH3(CH2)11)phenyl phosphate, di-(3-CH3(CH2)11) phenyl phosphate, di-(4-CH3(CH2)11)phenyl phosphate, di-(5-CH3(CH2)11)phenyl phosphate, di-(6-CH3(CH2)11) phenyl phosphate, di-(1-CH3(CH2)12)phenyl phosphate, di-(2-CH3(CH2)12)phenyl phosphate, di-(3-CH3(CH2)12) phenyl phosphate, di-(4-CH3(CH2)12)phenyl phosphate, di-(5-CH3(CH2)12)phenyl phosphate, di-(6-CH3(CH2)12) phenyl phosphate, tri-ethylene phosphate, tri-(1-propene) phosphate, tri-(2-propene)phosphate, tri-(3-propene) phosphate, tri-(1-(1-butene))phosphate, tri-(2-(1-butene)) phosphate, tri-(3-(1-butene))phosphate, tri-(4-(1-butene)) phosphate, tri-(1-(2-butene))phosphate, tri-(2-(2-butene)) phosphate, tri-(3-(2-butene))phosphate, tri-(4-(2-butene)) phosphate, tri-(1-(1-pentene))phosphate, tri-(2-(1-pentene)) phosphate, tri-(3-(1-pentene))phosphate, tri-(4-(1-pentene))

phosphate, tri-(5-(1-pentene))phosphate, tri-(1-(2-pentene)) phosphate, tri-(2-(2-pentene))phosphate, tri-(3-(2-pentene)) phosphate, tri-(4-(2-pentene))phosphate, tri-(5-(2-pentyl)) phosphate, tri-(1-(1-hexene))phosphate, tri-(2-(1-hexene)) phosphate, tri-(3-(1-hexene))phosphate, tri-(4-(1-hexene)) phosphate, tri-(5-(1-hexene))phosphate, tri-(6-(1-hexene)) phosphate, tri-(1-(3-hexene))phosphate, tri-(2-(3-hexene)) phosphate, tri-(3-(3-hexene))phosphate, tri-(4-(3-hexene)) phosphate, tri-(5-(3-hexene))phosphate, tri-(6-(3-hexene)) phosphate, tri-(1-(2-hexene))phosphate, tri-(2-(2-hexene)) phosphate, tri-(3-(2-hexene))phosphate, tri-(4-(2-hexene)) phosphate, tri-(5-(2-hexene))phosphate, tri-(6-(2-hexene)) phosphate, tri-(phenyl methyl)phosphate, tri-(2-methyl phenyl)phosphate, tri-(3-methyl phenyl)phosphate, tri-(4-methyl phenyl)phosphate, tri-(2-ethyl phenyl)phosphate, tri-(3-ethyl phenyl)phosphate, and tri-(4-ethyl phenyl) phosphate.

Specific examples of di-phosphates include:
di-methyl phosphate, di-ethyl phosphate, di-(1-propyl) phosphate, di-(2-propyl)phosphate, di-(1-butyl)phosphate, di-(2-butyl)phosphate, di-(1-tert-butyl)phosphate, di-(2-tert-butyl)phosphate, di-(1-pentyl)phosphate, di-(2-pentyl) phosphate, di-(3-pentyl)phosphate, di-(1-hexyl)phosphate, di-(2-hexyl)phosphate, di-(3-hexyl)phosphate, di-(1-heptyl) phosphate, di-(2-heptyl)phosphate, di-(3-heptyl)phosphate, di-(4-heptyl)phosphate, di-(1-octyl)phosphate, di-(2-octyl) phosphate, di-(3-octyl)phosphate, di-(4-octyl)phosphate, di-(1-CH3(CH2)8)phosphate, di-(2-CH3(CH2)8)phosphate, di-(3-CH3(CH2)8)phosphate, di-(4-CH3(CH2)8)phosphate, di-(1-CH3(CH2)9)phosphate, di-(2-CH3(CH2)9)phosphate, di-(3-CH3(CH2)9)phosphate, di-(4-CH3(CH2)9)phosphate, di-(5-CH3(CH2)9)phosphate, di-(1-CH3(CH2)10) phosphate, di-(2-CH3(CH2)10)phosphate, di-(3-CH3(CH2)10)phosphate, di-(4-CH3(CH2)10)phosphate, di-(5-CH3(CH2)10)phosphate, di-(1-CH3(CH2)11)phosphate, di-(2-CH3(CH2)11)phosphate, di-(3-CH3(CH2)11)phosphate, di-(4-CH3(CH2)11)phosphate, di-(5-CH3(CH2)11)phosphate, di-(6-CH3(CH2)11)phosphate, di-(1-CH3(CH2)12) phosphate, di-(2-CH3(CH2)12)phosphate, di-(3-CH3(CH2)12)phosphate, di-(4-CH3(CH2)12)phosphate, di-(5-CH3(CH2)12)phosphate, di-(6-CH3(CH2)12)phosphate, di-(1-(methyl pentyl))phosphate, di-(2-(methyl pentyl)) phosphate, di-(3-(methyl pentyl))phosphate, di-(1-(di-methyl pentyl))phosphate, di-(2-(di-methyl pentyl)) phosphate, di-(3-(di-methyl pentyl))phosphate, di-(1-(ethyl pentyl))phosphate, di-(2-(ethyl pentyl))phosphate, di-(3-(ethyl pentyl))phosphate, di-(1-(methyl hexyl))phosphate, di-(2-(methyl hexyl))phosphate, di-(3-(methyl hexyl)) phosphate, di-(1-(di-methyl hexyl))phosphate, di-(2-(di-methyl hexyl))phosphate, di-(3-(di-methyl hexyl)) phosphate, di-(1-(ethyl hexyl))phosphate, di-(2-(ethyl hexyl))phosphate, di-(3-(ethyl hexyl))phosphate, di-(methyl heptyl)phosphate, di-(di-methyl heptyl)phosphate, di-(ethyl heptyl)phosphate, di-(methyl octyl)phosphate, di-(di-methyl octyl)phosphate, di-(ethyl octyl)phosphate, methyl ethyl phosphate, methyl propyl phosphate, methyl butyl phosphate, methyl tert-butyl phosphate, methyl pentyl phosphate, methyl hexyl phosphate, methyl heptyl phosphate, methyl octyl phosphate, methyl CH3(CH2)8 phosphate, methyl CH3(CH2)9 phosphate, methyl CH3(CH2)10 phosphate, methyl CH3(CH2)11 phosphate, methyl CH3(CH2)12 phosphate, ethyl propyl phosphate, ethyl butyl phosphate, ethyl tert-butyl phosphate, ethyl pentyl phosphate, ethyl hexyl phosphate, ethyl heptyl phosphate, ethyl octyl phosphate, ethyl CH3(CH2)8 phosphate, ethyl CH3(CH2)9 phosphate, ethyl CH3(CH2)10 phosphate, ethyl CH3(CH2)11 phosphate, ethyl CH3(CH2)12 phosphate, propyl butyl phosphate, propyl tert-butyl phosphate, propyl pentyl phosphate, propyl hexyl phosphate, propyl heptyl phosphate, propyl octyl phosphate, propyl CH3(CH2)8 phosphate, propyl CH3(CH2)9 phosphate, propyl CH3(CH2)10 phosphate, propyl CH3(CH2)11 phosphate, propyl CH3(CH2)12 phosphate, butyl tert-butyl phosphate, tert-butyl pentyl phosphate, tert-butyl hexyl phosphate, tert-butyl heptyl phosphate, tert-butyl octyl phosphate, tert-butyl CH3(CH2)8 phosphate, tert-butyl CH3(CH2)9 phosphate, tert-butyl CH3(CH2)10 phosphate, tert-butyl CH3(CH2)11 phosphate, tert-butyl CH3(CH2)12 phosphate, pentyl hexyl phosphate, pentyl heptyl phosphate, pentyl octyl phosphate, pentyl CH3(CH2)8 phosphate, pentyl CH3(CH2)9 phosphate, pentyl CH3(CH2)10 phosphate, pentyl CH3(CH2)11 phosphate, pentyl CH3(CH2)12 phosphate, hexyl heptyl phosphate, hexyl octyl phosphate, hexyl CH3(CH2)8 phosphate, hexyl CH3(CH2)9 phosphate, hexyl CH3(CH2)10 phosphate, hexyl CH3(CH2)11 phosphate, hexyl CH3(CH2)12 phosphate, di-butene phosphate, di-pentene phosphate, di-hexene phosphate, di-heptene phosphate, and di-octene phosphate.

Specific examples of mono-phosphates include: methyl phosphate, ethyl phosphate, propyl phosphate, butyl phosphate, pentyl phosphate, hexyl phosphate, heptyl phosphate, octyl phosphate, CH3(CH2)8 phosphate, CH3(CH2)9 phosphate, CH3(CH2)10 phosphate, CH3(CH2)11 phosphate, CH3(CH2)12 phosphate, methyl propyl phosphate, methyl butyl phosphate, methyl pentyl phosphate, methyl hexyl phosphate, methyl heptyl phosphate, methyl octyl phosphate, methyl CH3(CH2)8 phosphate, methyl CH3(CH2)9 phosphate, methyl CH3(CH2)10 phosphate, methyl CH3(CH2)11 phosphate, methyl CH3(CH2)12 phosphate, di-methyl butyl phosphate, di-methyl pentyl phosphate, di-methyl hexyl phosphate, di-methyl heptyl phosphate, di-methyl octyl phosphate, di-methyl CH3(CH2)8 phosphate, di-methyl CH3(CH2)9 phosphate, di-methyl CH3(CH2)10 phosphate, di-methyl CH3(CH2)11 phosphate, di-methyl CH3(CH2)12 phosphate, ethyl butyl phosphate, ethyl pentyl phosphate, ethyl hexyl phosphate, ethyl heptyl phosphate, ethyl octyl phosphate, ethyl CH3(CH2)8 phosphate, ethyl CH3(CH2)9 phosphate, ethyl CH3(CH2)10 phosphate, ethyl CH3(CH2)11 phosphate, ethyl CH3(CH2)12 phosphate, butene phosphate, pentene phosphate, hexene phosphate, heptene phosphate, and octene phosphate.

For purposes of brevity, a complete list of phosphites is not provided; however, applicable phosphite species correspond to the each of the tri, di, and mono phosphates provided in the preceding paragraphs. For example, by simply replacing the word "phosphate" with "phosphite" in the preceding paragraphs, one can quickly generate a list of representative phosphite species applicable to the subject invention.

Examples of phosphine compounds include:
tri-(1-hexyl)phosphine, tri-(2-hexyl)phosphine, tri-(3-hexyl) phosphine, tri-(1-heptyl)phosphine, tri-(2-heptyl)phosphine, tri-(3-heptyl)phosphine, tri-(4-heptyl)phosphine, tri-(1-Octyl)phosphine, tri-(2-octyl)phosphine, tri-(3-octyl) phosphine, tri-(4-octyl)phosphine, tri-(1-CH3(CH2)8) phosphine, tri-(2-CH3(CH2)8)phosphine, tri-(3-CH3(CH2)8)phosphine, tri-(4-CH3(CH2)8)phosphine, tri-(1-CH3(CH2)9)phosphine tri-(2-CH3(CH2)9)phosphine, tri-(3-CH13(CH2)9)phosphine, tri-(4-CH3(CH2)9)phosphine, tri-(5-CH3(CH2)9)phosphine, tri-(1-CH3(CH2)10)phosphine, tri-(2-CH3(CH2)10)phosphine, tri-(3-CH3(CH2)10) phosphine, tri-(4-CH3(CH2)10)phosphine, tri-(5-CH3(CH2)10)phosphine, tri-(1-CH3(CH2)11)phosphine, tri-(2-

CH3(CH2)11)phosphine, tri-(3-CH3(CH2)11)phosphine, tri-(4-CH3(CH2)11)phosphine, tri-(5-CH3(CH2)11) phosphine, tri-(6-CH3(CH2)11)phosphine, tri-(1-CH3 (CH2)12)phosphine, tri-(2-CH3(CH2)12)phosphine, tri-(3-CH3(CH2)12)phosphine, tri-(4-CH3(CH2)12)phosphine, tri-(5-CH3(CH2)12)phosphine, tri-(6-CH3(CH2)12) phosphine, methyl di-(1-hexyl)phosphine, methyl di-(2-hexyl)phosphine, methyl di-(3-hexyl)phosphine, methyl di-(1-heptyl)phosphine, methyl di-(2-heptyl)phosphine, methyl di-(3-heptyl)phosphine, methyl di-(4-heptyl)phosphine, methyl di-(1-octyl)phosphine, methyl di-(2-octyl) phosphine, methyl di-(3-octyl)phosphine, methyl di-(4-octyl)phosphine, methyl di-(1-CH3(CH2)8)phosphine, methyl di-(2-CH3(CH2)8)phosphine, methyl di-(3-CH3 (CH2)8)phosphine, methyl di-(4-CH3(CH2)8)phosphine, methyl di-(1-CH3(CH2)9)phosphine, methyl di-(2-CH3 (CH2)9)phosphine, methyl di-(3-CH3(CH2)9)phosphine, methyl di-(4-CH3(CH2)9)phosphine, methyl di-(5-CH3 (CH2)9)phosphine, methyl di-(1-CH3(CH2)10)phosphine, methyl di-(2-CH3(CH2)10)phosphine, methyl di-(3-CH3 (CH2)10)phosphine, methyl di-(4-CH3(CH2)10)phosphine, methyl di-(5-CH3(CH2)10)phosphine, methyl di-(1-CH3 (CH2)11)phosphine, methyl di-(2-CH3(CH2)11)phosphine, methyl di-(3-CH3(CH2)11)phosphine, methyl di-(4-CH3 (CH2)11)phosphine, methyl di-(5-CH3(CH2)11)phosphine, methyl di-(6-CH3(CH2)11)phosphine, methyl di-(1-CH3 (CH2)12)phosphine, methyl di-(2-CH3(CH2)12)phosphine, methyl di-(3-CH3(CH2)12)phosphine, methyl di-(4-CH3 (CH2)12)phosphine, methyl di-(5-CH3(CH2)12)phosphine, methyl di-(6-CH3(CH2)12)phosphine, ethyl di-(1-hexyl) phosphine, ethyl di-(2-hexyl)phosphine, ethyl di-(3-hexyl) phosphine, ethyl di-(1-heptyl)phosphine, ethyl di-(2-heptyl) phosphine, ethyl di-(3-heptyl)phosphine, ethyl di-(4-heptyl) phosphine, ethyl di-(1-octyl)phosphine, ethyl di-(2-octyl) phosphine, ethyl di-(3-octyl)phosphine, ethyl di-(4-octyl) phosphine, ethyl di-(1-CH3(CH2)8)phosphine, ethyl di-(2-CH3(CH2)8)phosphine, ethyl di-(3-CH3(CH2)8)phosphine, ethyl di-(4-CH3(CH2)8)phosphine, ethyl di-(1-CH3(CH2) 9)phosphine, ethyl di-(2-CH3(CH2)9)phosphine, ethyl di-(3-CH3(CH2)9)phosphine, ethyl di-(4-CH3(CH2)9) phosphine, ethyl di-(5-CH3(CH2)9)phosphine, ethyl di-(1-CH3(CH2)10)phosphine, ethyl di-(2-CH3(CH2)10) phosphine, ethyl di-(3-CH3(CH2)10)phosphine, ethyl di-(4-CH3(CH2)10)phosphine, ethyl di-(5-CH3(CH2)10) phosphine, ethyl di-(1-CH3(CH2)11)phosphine, ethyl di-(2-CH3(CH2)11)phosphine, ethyl di-(3-CH3(CH2)11) phosphine, ethyl di-(4-CH3(CH2)11)phosphine, ethyl di-(5-CH3(CH2)11)phosphine, ethyl di-(6-CH3(CH2)11) phosphine, ethyl di-(1-CH3(CH2)12)phosphine, ethyl di-(2-CH3(CH2)12)phosphine, ethyl di-(3-CH3(CH2)12) phosphine, ethyl di-(4-CH3(CH2)12)phosphine, ethyl di-(5-CH3(CH2)12)phosphine, ethyl di-(6-CH3(CH2)12) phosphine, 1-propyl di-(1-hexyl)phosphine, 1-propyl di-(2-hexyl)phosphine, 1-propyl di-(3-hexyl)phosphine, 1-propyl di-(1-heptyl)phosphine, 1-propyl di-(2-heptyl)phosphine, 1-propyl di-(3-heptyl)phosphine, 1-propyl di-(4-heptyl) phosphine, 1-propyl di-(1-octyl)phosphine, 1-propyl di-(2-octyl)phosphine, 1-propyl di-(3-octyl)phosphine, 1-propyl di-(4-octyl)phosphine, 1-propyl di-(1-CH3(CH2)8) phosphine, 1-propyl di-(2-CH3(CH2)8)phosphine, 1-propyl di-(3-CH3(CH2)8)phosphine, 1-propyl di-(4-CH3(CH2)8) phosphine, 1-propyl di-(1-CH3(CH2)9)phosphine, 1-propyl di-(2-CH3(CH2)9)phosphine, 1-propyl di-(3-CH3(CH2)9) phosphine, 1-propyl di-(4-CH3(CH2)9)phosphine, 1-propyl di-(5-CH3(CH2)9)phosphine, 1-propyl di-(1-CH3(CH2)10) phosphine, 1-propyl di-(2-CH3(CH2)10)phosphine, 1-propyl di-(3-CH3(CH2)10)phosphine, 1-propyl di-(4-CH3(CH2)10)phosphine, 1-propyl di-(5-CH3(CH2)10) phosphine, 1-propyl di-(1-CH3(CH2)11)phosphine, 1-propyl di-(2-CH3(CH2)11)phosphine, 1-propyl di-(3-CH3(CH2)11)phosphine, 1-propyl di-(4-CH3(CH2)11) phosphine, 1-propyl di-(5-CH3(CH2)11)phosphine, 1-propyl di-(6-CH3(CH2)11)phosphine, 1-propyl di-(1-CH3(CH2)12)phosphine, 1-propyl di-(2-CH3(CH2)12) phosphine, 1-propyl di-(3-CH3(CH2)12)phosphine, 1-propyl di-(4-CH3(CH2)12)phosphine, 1-propyl di-(5-CH3(CH2)12)phosphine, 1-propyl di-(6-CH3(CH2)12) phosphine, 2-propyl di-(1-hexyl)phosphine, 2-propyl di-(2-hexyl)phosphine, 2-propyl di-(3-hexyl)phosphine, 2-propyl di-(1-heptyl)phosphine, 2-propyl di-(2-heptyl)phosphine, 2-propyl di-(3-heptyl)phosphine, 2-propyl di-(4-heptyl) phosphine, 2-propyl di-(1-octyl)phosphine, 2-propyl di-(2-octyl)phosphine, 2-propyl di-(3-octyl)phosphine, 2-propyl di-(4-octyl)phosphine, 2-propyl di-(1-CH3(CH2)8) phosphine, 2-propyl di-(2-CH3(CH2)8)phosphine, 2-propyl di-(3-CH3(CH2)8)phosphine, 2-propyl di-(4-CH3(CH2)8) phosphine, 2-propyl di-(1-CH3(CH2)9)phosphine, 2-propyl di-(CH3(CH2)9)phosphine, 2-propyl di-(3-CH3(CH2)9) phosphine, 2-propyl di-(4-CH3(CH2)9)phosphine, 2-propyl di-(5-CH3(CH2)9)phosphine, 2-propyl di-(1-CH3(CH2)10) phosphine, 2-propyl di-(2-CH3(CH2)10)phosphine, 2-propyl di-(3-CH3(CH2)10)phosphine, 2-propyl di-(4-CH3(CH2)10)phosphine, 2-propyl di-(5-CH3(CH2)10) phosphine, 2-propyl di-(1-CH3(CH2)11)phosphine, 2-propyl di-(2-CH3(CH2)11)phosphine, 2-propyl di-(3-CH3(CH2)11)phosphine, 2-propyl di-(4-CH3(CH2)11) phosphine, 2-propyl di-(5-CH3(CH2)11)phosphine, 2-propyl di-(6-CH3(CH2)11)phosphine, 2-propyl di-(1-CH3(CH2)12)phosphine, 2-propyl di-(2-CH3(CH2)12) phosphine, 2-propyl di-(3-CH3(CH2)12)phosphine, 2-propyl di-(4-CH3(CH2)12)phosphine, 2-propyl di-(5-CH3(CH2)12)phosphine, 2-propyl di-(6-CH3(CH2)12) phosphine, butyl di-(1-hexyl)phosphine, butyl di-(2-hexyl) phosphine, butyl di-(3-hexyl)phosphine, butyl di-(1-heptyl) phosphine, butyl di-(2-heptyl)phosphine, butyl di-(3-heptyl) phosphine, butyl di-(4-heptyl)phosphine, butyl di-(1-octyl) phosphine, butyl di-(2-octyl)phosphine, butyl di-(3-octyl) phosphine, butyl di-(4-octyl)phosphine, butyl di-(1-CH3 (CH2)8)phosphine, butyl di-(2-CH3(CH2)8)phosphine, butyl di-(3-CH3(CH2)8)phosphine, butyl di-(4-CH3(CH2) 8)phosphine, butyl di-(1-CH3(CH2)9)phosphine, butyl di-(2-CH3(CH2)9)phosphine, butyl di-(3-CH3(CH2)9) phosphine, butyl di-(4-CH3(CH2)9)phosphine, butyl di-(5-CH3(CH2)9)phosphine, butyl di-(1-CH3(CH2)10) phosphine, butyl di-(2-CH3(CH2)10)phosphine, butyl di-(3-CH3(CH2)10)phosphine, butyl di-(4-CH3(CH2)10) phosphine, butyl di-(5-CH3(CH2)10)phosphine, butyl di-(1-CH3(CH2)11)phosphine, butyl di-(2-CH3(CH2)11) phosphine, butyl di-(3-CH3(CH2)11)phosphine, butyl di-(4-CH3(CH2)11)phosphine, butyl di-(5-CH3(CH2)11) phosphine, butyl di-(6-CH3(CH2)11)phosphine, butyl di-(1-CH3(CH2)12)phosphine, butyl di-(2-CH3(CH2)12) phosphine, butyl di-(3-CH3(CH2)12)phosphine, butyl di-(4-CH3(CH2)12)phosphine, butyl di-(5-CH3(CH2)12) phosphine, butyl di-(6-CH3(CH2)12)phosphine, methyl hexyl heptyl phosphine, methyl hexyl octyl phosphine, ethyl propyl butyl phosphine, ethyl propyl pentyl phosphine, ethyl propyl hexyl phosphine, ethyl propyl heptyl phosphine, ethyl propyl octyl phosphine, ethyl butyl pentyl phosphine, ethyl butyl hexyl phosphine, ethyl butyl heptyl phosphine, ethyl butyl octyl phosphine, ethyl pentyl hexyl phosphine, ethyl pentyl heptyl phosphine, ethyl pentyl octyl phosphine, ethyl hexyl heptyl phosphine, ethyl hexyl octyl phosphine, tri-phenyl phosphine, 1 hexyl di-phenyl phosphine, 2 hexyl di-phenyl phosphine, 3 hexyl di-phenyl phosphine, 1 heptyl di-phenyl phosphine, 2 heptyl di-phenyl phosphine, 3 heptyl di-phenyl phosphine, 4 heptyl di-phenyl phosphine, 1 octyl di-phenyl phosphine, 2 octyl di-phenyl phosphine, 3 octyl di-phenyl phosphine, 4 octyl di-phenyl phosphine, 1 CH3(CH2)8 di-phenyl phosphine, 2 CH3(CH2)8 di-phenyl phosphine, 3 CH3(CH2)8 di-phenyl phosphine, 4 CH3(CH2)8 di-phenyl phosphine, 1 CH3(CH2)9 di-phenyl phosphine, 2 CH3(CH2)9 di-phenyl phosphine, 3 CH3(CH2)9 di-phenyl phosphine, 4 CH3(CH2)9 di-phenyl phosphine, 5 CH3(CH2)9 di-phenyl phosphine, 1 CH3(CH2)10 di-phenyl phosphine, 2 CH3(CH2)10 di-phenyl phosphine, 3 CH3(CH2)10 di-phenyl phosphine, 4 CH3(CH2)10 di-phenyl phosphine, 5 CH3(CH2)10 di-phenyl phosphine, 1 CH3(CH2)11 di-phenyl phosphine, 2 CH3(CH2)11 di-phenyl pheine, 3 CH3(CH2)11 di-phenyl phosphen phopine, 4 CH3(CH2)11 di-phenyl phosphine, 5 CH3(CH2 )11 di-phenyl phosphine, 6 CH3(CH2 )11 di-phenyl phosphine, CH3(CH2)12 di-phenyl phosphe ine, CH3(CH2)12 phenyl phe, phosphine, 3 CH3(CH2)12 di-phenyl phosphine, 4 CH3(CH2)12 di-phenyl phosphine, 5 CH3(CH2)12 di-phenyl phosphine, 6 CH3(CH2)12 di-phenyl phosphine, di-(1-hexyl)phenyl phosphine, di-(2-hexyl)phenyl phosphine, di-(3-hexyl)phenyl phosphine, di-(1-heptyl)phenyl phosphine, di-(2-heptyl)phenyl phosphine, di-(3-heptyl)phenyl phosphine, di-(4-heptyl)phenyl phosphine, di-(1-octyl)phenyl phosphine, di-(2-octyl)phenyl phosphine, di-(3-octyl)phenyl phosphine, di-(4-octyl)phenyl phosphine, di-(1-CH3(CH2)8)phenyl phosphine, di-(2-CH3(CH2)8)phenyl phosphine, di-(3-CH3(CH2)8)phenyl phosphine, di-(4-CH3(CH2)8)phenyl phosphine, di-(1-CH3(CH2)9)phenyl phosphine, di-(2-CH3(CH2)9)phenyl phosphine, di-(3-CH3(CH2)9)phenyl phosphine, di-(4-CH3(CH2)9)phenyl phosphine, di-(5-CH3(CH2)9)phenyl phosphine, di-(1-CH3(CH2)10)phenyl phosphine, di-(2-CH3(CH2)10)phenyl phosphine, di-(3-CH3(CH2)10)phenyl phosphine, di-(4-CH3(CH2)10)phenyl phosphine, di-(5-CH3(CH2)10)phenyl phosphine, di-(1-CH3(CH2)11)phenyl phosphine, di-(2-CH3(CH2)11)phenyl phosphine, di-(3-CH3(CH2)11)phenyl phosphine, di-(4-CH3(CH2)11) phenyl phosphine, di-(5-CH3(CH2)11)phenyl phosphine, di-(6-CH3(CH2)11)phenyl phosphine, di-(1-CH3(CH2)12) phenyl phosphine, di-(2-CH3(CH2)12)phenyl phosphine, di-(3-CH3(CH2)12)phenyl phosphine, di-(4-CH3(CH2)12) phenyl phosphine, di-(5-CH3(CH2)12)phenyl phosphine, di-(6-CH3(CH2)12)phenyl phosphine, tri-(phenyl methyl)phosphine, tri-(2-methyl phenyl)phosphine, tri-(3-methyl phenyl)phosphine, tri-(4-methyl phenyl)phosphine, tri-(2-ethyl phenyl)phosphine, tri-(3-ethyl phenyl)phosphine, tri-(4-ethyl phenyl)phosphine, tri-(hexene)phosphine, tri-(heptene)phosphine, tri-(octene)phosphine, tri-(heptyl)phosphine, tri-(heptyl)phosphine, tri-(heptyl)phosphine, and tri-(heptyl)phosphine.

Examples of the phosphine oxides correspond to each of the above-listed phosphines. A listing of such oxides can be quickly generated by simply adding the word "oxides" to each of the above listed phosphine species.

Examples of di-phosphonates include: tetra-methyl di-phosphonate, tetra-ethyl di-phosphonate, tetra-(1-propyl) di-phosphonate, tetra-(2-propyl)di-phosphonate, tetra-(1-butyl)di-phosphonate, tetra-(2-butyl)di-phosphonate, tetra-(1-tert-butyl)di-phosphonate, tetra-(2-tert-butyl)di-phosphonate, tetra-(1-pentyl)di-phosphonate, tetra-(2-pentyl)di-phosphonate, tetra-(3-pentyl)di-phosphonate, tetra-(1-hexyl)di-phosphonate, tetra-(2-hexyl)di-phosphonate, tetra-(3-hexyl)di-phosphonate, tetra-(1-heptyl)di-phosphonate, tetra-(2-heptyl)di-phosphonate, tetra-(3-heptyl)di-phosphonate, tetra-(4-heptyl)di-phosphonate, tetra-(1-octyl)di-phosphonate, tetra-(2-octyl)di-phosphonate, tetra-(3-octyl)di-phosphonate, tetra-(4-octyl)di-phosphonate, tetra-(1-CH3(CH2)8)di-phosphonate, tetra-(2-CH3(CH2)8)di-phosphonate, tetra-(3-CH3(CH2)8)di-phosphonate, tetra-(4-CH3(CH2)8)di-phosphonate, tetra-(1-CH3(CH2)9)di-phosphonate, tetra-(2-CH3(CH2)9)di-phosphonate, tetra-(3-CH3(CH2)9)di-phosphonate, tetra-(4-CH3(CH2)9)di-phosphonate, tetra-(5-CH3(CH2)9)di-phosphonate, tetra-(1-CH3(CH2)10)di-phosphonate, tetra-(2-CH3(CH2)10)di-phosphonate, tetra-(3-CH3(CH2)10)di-phosphonate, tetra-(4-CH3(CH2)10)di-phosphonate, tetra-(5-CH3(CH2)10)di-phosphonate, tetra-(1-CH3(CH2)11)di-phosphonate, tetra-(2-CH3(CH2)11)di-phosphonate, tetra-(3-CH3(CH2)11)di-phosphonate, tetra-(4-CH3(CH2)11)di-phosphonate, tetra-(5-CH3(CH2)11)di-phosphonate, tetra-(6-CH3(CH2)12)di-phosphonate, tetra-(3-CH3(CH2)12)di-phosphonate, tetra-(2-CH3(CH2)12)di-phosphonate, tetra-(3-CH3(CH2)12)di-phosphonate, tetra-(4-CH3(CH2)12)di-phosphonate, tetra-(5-CH3(CH2)12)di-phosphonate, tetra-(6-CH3(CH2)12)di-phosphonate, tetra-phenyl di-phosphonate, di-methyl-(di-ethyl)di-phosphonate, di-methyl-(di-phenyl)di-phosphonate, and di-methyl-(di-4-pentene)di-phosphonate.

Examples of pyrophosphate compounds include: tetra-methyl pyrophosphate, tetra-ethyl pyrophosphate, tetra-(1-propyl)pyrophosphate, tetra-(2-propyl)pyrophosphate, tetra-(1-butyl)pyrophosphate, tetra-(2-butyl)pyrophosphate, tetra-(1-tert-butyl)pyrophosphate, tetra-(2-tert-butyl)pyrophosphate, tetra-(1-pentyl)pyrophosphate, tetra-(2-pentyl)pyrophosphate, tetra-(3-pentyl)pyrophosphate, tetra-(1-hexyl)pyrophosphate, tetra-(2-hexyl)pyrophosphate, tetra-(3-hexyl)pyrophosphate, tetra-(1-heptyl)pyrophosphate, tetra-(2-heptyl)pyrophosphate, tetra-(3-heptyl)pyrophosphate, tetra-(4-heptyl)pyrophosphate, tetra-(1-octyl)pyrophosphate, tetra-(2-octyl)pyrophosphate, tetra-(3-octyl)pyrophosphate, tetra-(4-octyl)pyrophosphate, tetra-(1-CH3(CH2)8)pyrophosphate, tetra-(2-CH3(CH2)8) pyrophosphate, tetra-(3-CH3(CH2)8)pyrophosphate, tetra-(4-CH3(CH2)8)pyrophosphate, tetra-(3-CH3(CH2)9) pyrophosphate, tetra-(2-CH3(CH2)9)pyrophosphate, tetra-(3-CH3(CH2)9)pyrophosphate, tetra-(4-CH3(CH2)9) pyrophosphate, tetra-(5-CH3(CH2)9)pyrophosphate, tetra-(4-CH3(CH2)10)pyrophosphate, tetra-(2-CH3(CH2)10) pyrophosphate, tetra-(3-CH3(CH2)10)pyrophosphate, tetra-(4-CH3(CH2)10)pyrophosphate, tetra-(5-CH3(CH2)10) pyrophosphate, tetra-(4-CH3(CH2)11)pyrophosphate, tetra-(2-CH3(CH2)10)pyrophosphate, tetra-(3-CH3(CH2)11) pyrophosphate, tetra-(4-CH3(CH2)11)pyrophosphate, tetra-(5-CH3(CH2)11)pyrophosphate, tetra-(6-CH3(CH2)11) pyrophosphate, tetra-(5-CH3(CH2)12)pyrophosphate, tetra-(2-CH3(CH2)12)pyrophosphate, tetra-(3-CH3(CH2)12) pyrophosphate, tetra-(4-CH3(CH2)12)pyrophosphate, tetra-(5-CH3(CH2)12)pyrophosphate, tetra-(6-CH3(CH2)12) pyrophosphate, tetra-phenyl pyrophosphate, di-methyl-(di-ethyl)pyrophosphate, di-methyl-(di-phenyl)pyrophosphate, and di-methyl-(di-4-pentene)pyrophosphate.

Examples of additional phosphorous containing compounds include those described in "Phosphorus Chemistry in Everyday Living" by A. Toy and E. Walsh (second edition, 1987, ACS, Washington, DC. Examples include: pyrophosphates, phosphonites, phosphorothioates, phosphonothioates, phosphonates, phosphorodithioates, bis-phosphorodithioates, phosphonodithioates, phosphoramidothioates, and pyrophosphoramide. Specific species include: tetra-propyl dithiono-pyrophosphate, tetra-ethyl dithiono-pyrophosphate, O-ethyl O-[2-(di-isopropyl amino)ethyl]methylphosphonite, O,O-dimethyl O-p-nitrohenyl phosphorothioate, O,O-diethyl O-p-nitrophenyl phosphorothioate, O,O-dimethyl O-(4-nitro-m-tolyl) phosphorothioate, O-ethyl O-p-nitrophenyl phenylphosphono-thioate, O,O-diethyl O-(3,5,6-trichloro-2-pyridyl)phosphorothioate, O,O-diethyl O-(2-isopropyl-6-methyl-4-pyrimidinyl)phosphorothioate, O,O-diethyl O-[4-methylsulfmyl)phenyl]phosphorothioate, O,O-dimethyl O-[3-methyl-4-(methyl thio)phenyl]phosphorothioate, O,O-dimethyl (2,2,2-trichloro-1-hydroxy-ethyl)phosphonate, 2,2-di-chlorovinyl di-methyl phosphate, 1,2-di-bromo-2,2-di-chloroethyl dimethyl phosphate, 2-chloro-1-(2,3,4-trichloro-phenyl)vinyl dimethyl phosphate, O-(4-bromo-2-chloro-phenyl) O-ethyl S-propyl phosphoro-thioate, O-ethyl-O-[4-(methyl-thio)phenyl] S-propyl phosphorodithioate, O-ethyl S,S-di-propyl phosphorodithioate, diethyl mercapto-succinate, S-ester with O,O-dimethyl phosphorodithioate, S-[(1,1-dimethyl-ethyl)-thio)methyl] O,O-di ethyl phosphorodithioate, O,O-dimethyl S-phthalimido-methyl phosphorodithoate, O,O-dimethyl S-4-oxo-1,2,3-benzotriazin 3(4H)-ylmethyl phosphorodithioate, O,O,O',O"-tetraethyl S,S'-methlene bis-phosphorodithioate, S-[(6-chloro-2-oxo-3-(2H)-benzoxazolyl)methyl] O,O-di-ethyl phosphorodithionate, S-[(p-chlorophenyl-thio)methyl] O,O-diethyl phosphorodithioate, 1,4-p-dioxane-2,3,-di-thiol S,S-bis(O,O-diethyl phosphorodithioate, O-ethyl S-phenyl Ethyl-phosphonodithioate, O,S-dimethyl phosphoramidothioate, O,S-dimethyl acetyl-phosphoramidothioate, 1-methylethyl 2-[[ethoxy[(1-methylethyl) amino]phosphinothioy]oxy] benzoate, dimethyl dichlorovinyl phosphate, O,O-diethyl S-ethyl-thiomethyl phosphorodithioate, O,O-dimethyl S-(methyl-carbamoylmethyl)phosphorodithioate, ethyl 3-methyl-4-(methylthio)phenyl (1-methylethyl)-phosphoroamidate, O,O-dimethyl O-[2-(methycarbanmoyl)-1-methyl-vinyl]phosphate, and octamethylpyrophosphoramide.

Specific examples of phosphinates include: ethyl pentyl phosphinate, ethyl hexyl phosphinate, ethyl heptyl phosphinate, ethyl octyl phosphinate, ethyl decyl phosphinate, ethyl phenyl phosphinate, butyl pentyl phosphinate, butyl hexyl phosphinate, butyl heptyl phosphinate, pentyl dibutyl phosphinate, hexyl dibutyl phosphinate, and heptyl dibutyl phosphinate.

Examples of phosphinic acids include: pentyl phosphinic acid, hexyl phosphinic acid, heptyl phosphinic acid, octyl phosphinic acid, decyl phosphinic acid, phenyl phosphinic acid, di pentyl phosphinic acid, di heptyl phosphinic acid, di decyl phosphinic acid, di phenyl phosphinic acid, phenyl hexyl phosphinic acid, and pentyl decyl phosphinic acid.

Examples of phosphinous acids include: monopentyl phosphinous acid, monohexyl phosphinous acid, monoheptyl phosphinous acid, monooctyl phosphinous acid, monodecyl phosphinous acid, monophenyl phosphinous acid, dipropyl phosphinous acid, dipentyl phosphinous acid, diheptyl phosphinous acid, didecyl phosphinous acid, diphenyl phosphinous acid, and propyl decyl phosphinous acid.

Examples of phosphonates include: hexyl pentyl phosphonate, heptyl pentyl phosphonate, octyl pentyl phosphonate, decyl pentyl phosphonate, phenyl pentyl phosphonate, dibutyl pentyl phosphonate, dihexylphosphonate, heptylphosphonate, pentylphosphonate, octylphosphonate, and phenylphosphonate.

Examples of phosphonic acids include: pentyl phosphonic acid, hexyl phosphonic acid, heptyl phosphonic acid, octyl phosphonic acid, decyl phosphonic acid, phenyl phosphonic acid, methyl pentyl phosphonic acid, methyl phenyl phosphonic acid, pentylphosphonic acid, octylphosphonic acid, phenylphosphonic acid, and pentyl octylphosphonic acid.

Examples of phosphonites include: ethyl pentyl phosphonite, ethyl hexyl phosphonite, ethyl heptyl phosphonite, ethyl octyl phosphonite, ethyl decyl phosphonite, ethyl phenyl phosphonite, butyl pentyl phosphonite, butyl hexyl phosphonite, butyl heptyl phosphonite, diethyl pentyl phosphonite, diethyl hexyl phosphonite, and diethyl heptyl phosphonite.

Examples of phosphonous acids include: 1-pentyl phosphonous acid, 2-pentyl phosphonous acid, 3-pentyl phosphonous acid, 1-hexyl phosphonous acid, 2-hexyl phosphonous acid, 3-hexyl phosphonous acid, 1-heptyl phosphonous acid, 2-heptyl phosphonous acid, 3-heptyl phosphonous acid, 4-heptyl phosphonous acid, octyl phosphonous acid, decyl phosphonous acid, and phenyl phosphonous acid.

The material of construction of the porous support of the composite membrane is not critical to the invention. Any porous support that provides physical strength to the discriminating layer may be employed, so long as the pore sizes are sufficiently large to permit the unhindered passage of permeate but not so large as to interfere with the bridging-over of the resulting discriminating layer. Typical pore sizes will range from 10 to 1,000 nanometers. Typical support materials that are known in the art include cellulose esters, polysulfones, polyether sulfones, polyvinyl chloride, chlorinated polyvinyl chloride, polyvinylidene fluoride, polystyrenes, polycarbonates, polyimides, polyacrylonitriles, and polyesters. A particularly preferred class of support materials are polysulfones. Preparation of such supports are described in U.S. Pat. Nos. 3,926,798; 4,039,440; and 4,277,344, all of which are incorporated herein by reference. The thickness of the microporous support is usually 25 to 125 micrometers, and preferably from 40 to 75 micrometers.

A variety of membrane shapes are commercially available and useful in the present invention. These include spiral wound, hollow fiber, tubular, or flat sheet type membranes. In regard to the composition of the membrane, often the discriminating layer has hygroscopic polymers other than the polyamide coated upon the surface of the discriminating layer. Among these polymers are anionic, cationic, neutral and zwitterionic such as polymeric surfactants, polyvinyl alcohol, polyethylene imine and polyacrylic acid.

The membranes of the present invention may be subjected to various post treatments as described in U.S. Pat. Nos. 4,765,897; 5,876,602 and 5,755,964, all of which are incorporated herein by reference. Such post treatments may further enhance membrane performance, e.g., increased flux and/or decreased salt passage.

For example, as described in U.S. Pat. No. 5,876,602, membrane stability to strong base exposure (while maintaining flux and salt passage) can be achieved by contacting the membrane, after it has been formed on a porous support, whether in flat sheet or element form, with a hypochlorite solution at a pH of at least 10.5. The optimal exposure time depends on the temperature and concentration of the hypochlorite used. At room temperature, conditions which achieve the stated goals can generally be found within the ranges of 10 minutes to 5 hours and at concentrations of 200 to 10,000 ppm by weight of hypochlorite, measured as chlorine. Preferred concentrations of hypochlorite are 500 to 7,000 ppm; preferred exposure times are 30 minutes to three hours. In a preferred embodiment the membrane is subjected to a heat treatment before being exposed to the aforementioned chlorine treatment. The membranes are heated in water at a temperature of 40° C. to 100° C. for times of 30 seconds to 24 hours. The heat treatment results in a further lowering of the salt passage and the removal of impurities contained in the membrane which otherwise may interfere in the beneficial results of the chlorine treatment. Depending on the application desired, the two treatment conditions can be adjusted within the ranges stated such that the salt passage is improved while maintaining or even improving flux over either treatment alone. The order in which the two treatments are conducted is critical since heat treating the membrane simultaneously with or subsequently to the chlorine treatment does not provide the improved results obtained by first heat treating the membrane followed by the chlorine treatment.

Another example of an applicable post treatment is described in U.S. Pat. No. 5,755,964, which comprises contacting the discriminating layer with an amine from the group consisting of: ammonia optionally substituted with one or more alkyl groups of one to two carbons which alkyl groups may be further optionally substituted with one or more substituents selected from hydroxy, phenyl, or amino; butylamine; cyclohexylamine; 1,6-hexanediamine and mixtures thereof. Preferred substituted ammonia substances include those such as dimethylamine; trimethylamine; ethylamine; triethanolamine; N,N-dimethyl ethanolamine; ethylenediamine; and benzylamine. It has been discovered that by contacting the above amines with the discriminating layer, the flux is increased and the rejection rates for particular substances may be changed. The degree that the flux of the membrane is increased or enhanced may be controlled by varying the particular amine employed, the concentration of the amine, the time of contact between the discriminating layer and amine, the temperature of the contact, the pH of the amine solution, or combinations thereof. As the flux is increased, the selectivity of the membrane may change, i.e., the membrane may allow univalent ions such as sodium to pass through the membrane at a higher rate while only rejecting divalent ions and organic compounds.

The amine used to treat the polyamide discriminating layer may be in solution, neat, or even a gas phase so long as it can be contacted with the polyamide. Gas phases may typically be employed for lower molecular weight amines such as ammonia, methylamine, and dimethylamine. The solvent may be any solvent in which the amine is soluble so long as the flux enhancement and the performance of the membrane is not hindered by contact with the solvent. Typical solvents may include water and organic compounds such as alcohols and hydrocarbons provided the support is not dissolved by the solvent. Generally, because of its ease of handling and its availability, water is employed if a solvent is desired.

The extent that the flux of the membrane is enhanced when treated with the amines of this invention varies depending upon the particular amine employed. At least one general trend applies in most situations, however. The trend being that the more functional groups which are present on the amine, e.g., alcohol and/or amino groups, the greater the increase in flux. Correspondingly, the concentration of the amine and time of contact are interrelated and affect the degree of flux enhancement. The minimum length of time that a particular amine is required to be contacted with the discriminating layer for an increase in flux depends to a great extent upon the concentration of the amine. Generally, the higher the concentration of the amine, the shorter the necessary length of contacting time to increase the flux. In most cases, the concentration of the amine should be at least about 5, preferably at least about 20, most preferably at least about 50, to about 100 percent by weight. The minimum time of contact can be from at least about 15 seconds, preferably at least about one minute, more preferably at least about 30 minutes when contacted at ambient temperatures.

In general, the longer the time of contact and the higher the concentration of the amine, the greater the increase in flux. After a prolonged time of contact, the flux will reach its maximum increase and no longer increase. At this point, the membrane may be used or continued to be stored in the amine. The time to reach the maximum increase varies depending upon the particular amine employed, the concentration of the amine, and the temperature of contact but is ascertainable by one skilled in the art without undue experimentation by utilizing the general trends disclosed above. For most amines and concentrations, the flux of the membrane will be maximized once the discriminating layer has been contacted for about 5 days with the amine. If it is desired to shorten the minimum length of time of contact, then the surface temperature of the polyamide discriminating layer may be increased. Although this applies generally, it is particularly advantageous if low concentrations of an amine which might require a long contacting time are being employed. Although temperature from about 0° to about 30° C. are most conveniently used, increased temperatures may shorten the necessary contacting time. The increased temperatures should not be so high that the membrane's performance is reduced, i.e., not above about 130° C. Typical temperatures which will hasten the flux effect of the membrane are from at least about 30° C., preferably at least about 60° C. to about 130° C. These temperatures may be reached by contacting the amine with the polyamide discriminating layer in a device such as an oven or a dryer. Typical ovens or dryers which may be employed include convection, infrared, or forced air dryers.

The pH of the amine solution to be contacted with the polyamide is not a critical aspect of the invention. However, the pH should not be so low that the particular amine being employed precipitates out of solution. On the other hand, the pH should not be so high that the polyamide discriminating layer is degraded or performance is negated. Preferably, a pH of about 7 to about 12 is useful in the method of the present invention and for some amines higher pHs may increase the degree of flux enhancement.

The method used to contact the amine with the discriminating layer may be any which allows the amine to become associated with the polyamide for a sufficient time to increase the flux. For instance, the polyamide may be partially or totally immersed or soaked in the amine or amine solution. The amine or amine solution may also be passed through, sprayed onto, or rolled onto the discriminating layer. Although the aforementioned methods may also be useful when the amine is a gas, the contacting of a gaseous amine with the discriminating layer is advantageously accomplished in a closed vessel to minimize the amount of amine employed.

Improved flux and rejection properties can also be achieved by post treating the subject membranes by contacting the membranes with a strong mineral acid, e.g. phosphoric acid, polyphosphoric acid, phosphorous acid, sulfuric acid, etc. Phosphoric acid at concentrations of from about 10 to about 85 weight percent are particularly preferred. As described in U.S. Pat. No. 4,765,987, the membrane may be contacted with the mineral acid, e.g., by spraying an aqueous acid solution onto the membrane, dipping the membrane in an aqueous acid bath, etc. In some embodiments the acid solution may be heated. Once treated with the mineral acid, the membrane may be further treated with the rejection enhancing agents, e.g., colloids, tannic acid, polyamidoamines, etc, as described in U.S. Pat. No. 4,765,897.

As used herein the following terms have the definitions provided: "rejection rate" is the percentage of a particular dissolved or dispersed material (i.e., solute) which does not flow through the membrane with the solvent. The rejection rate is equal to 100 minus the percentage of dissolved or dispersed material which passes through the membrane, i.e., solute passage, "salt passage" if the dissolved material is a salt. "Flux" is the flow rate per unit area at which solvent, typically water, passes through the membrane. "Reverse osmosis membrane" is a membrane which has a rejection rate for NaCl of from about 95 to about 100 percent. "Nanofiltration membrane" is a membrane which has a rejection rate for NaCl of from about 0 to about 95 percent and has a rejection rate for at least one divalent ion or organic compound of from about 20 to about 100 percent. "Polyamide" is a polymer in which amide linkages (—C(O)NH—) occur along the molecular chain.

EXAMPLES

The following examples illustrate the invention and should not be construed to limit the scope of the appended claims.

Composite membranes were made in the laboratory using a porous polysulfone support formed from a 16.5 percent polysulfone solution in DMF. The support was cut into rectangles (11 in. by 7 in.), clipped onto wire frames (10 in. by 7.5 in.) and placed in a 2.5 percent meta phenylene diamine (MPD) solution for approximately 20 minutes. The MPD soaked supports were then placed on a paper towel and rolled with a rubber roller to remove excess solution from both the back and front sides. The support was then placed on a plastic sheet and a silicone rubber gasket placed around the edge. A plastic sheet was cut with the opening being the same size as the opening in the gasket. This was clamped to form a leak proof seal at the edge. 50 ml of a Isopar L solution of trimesyol chloride (TMC) (0.09 percent weight/volume) containing a 1:2 stoichiometric ratio (TMC:phosphorous containing compound) of phosphorous containing compound of interest was then poured on top. The specific compound utilized in each example is provided in the Tables below. Control samples contained none of the subject phosphorous containing compounds. After 1 minute of reaction, the TMC solution was poured off and the membrane was rinsed with hexane and allowed to dry for the period of time specified in the Tables below. The formed composite membrane was then placed in water and tested using a 2000 ppm NaCl solution with a pH between 6.5 and 8 at 130 psi applied pressure. The membranes were run under these test conditions for 30 min and then the permeate was collected and analyzed. The results are provided in the Tables below. Due to the variability in preparation and testing conditions, a separate control membrane was prepared and tested with each prepared batch of membranes, as indicated in each Table below.

TABLE 1

| Example No. | Phorphorous-containing species | Dry Time (seconds) | Flux (gfd) | Salt Passage (percent) |
|---|---|---|---|---|
| 1 (control) | none | 60 | 11.7 | 0.79 |
| 2 | Tri-methyl phosphate | 60 | 23.3 | 2.7 |
| 3 | Tri-ethyl phosphate | 60 | 13.4 | 0.46 |
| 4 | Tri-butyl phosphate | 60 | 20.3 | 0.88 |

TABLE 2

| Example No. | Phorphorous-containing species | Dry Time (seconds) | Flux (gfd) | Salt Passage (percent) |
|---|---|---|---|---|
| 5 (control) | none | 60 | 12.1 | 1.2 |
| 6 | Dibutyl phosphite | 60 | 14.4 | 0.62 |

TABLE 3

| Example No. | Phorphorous-containing species | Dry Time (seconds) | Flux (gfd) | Salt Passage (percent) |
|---|---|---|---|---|
| 7 (control) | none | 10 | 14.7 | 0.7 |
| 8 | Bis(2-ethyl hexyl) phosphite | 10 | 23.7 | 1.06 |

TABLE 4

| Example No. | Phorphorous-containing species | Dry Time (seconds) | Flux (gfd) | Salt Passage (percent) |
|---|---|---|---|---|
| 9 (control) | none | 10 | 13.7 | 0.69 |
| 10 | Tri phenyl phosphine | 10 | 22.11 | 2.6 |
| 11 | Triethyl phosphate | 10 | 20.5 | 1.5 |

TABLE 5

| Example No. | Phorphorous-containing species | Dry Time (seconds) | Flux (gfd) | Salt Passage (percent) |
|---|---|---|---|---|
| 12 (control) | none | 10 | 16.6 | 0.26 |
| 13 | Tri phenyl phosphine | 10 | 31.8 | 3.32 |
| 14 | Tri phenyl phosphate | 10 | 22.9 | 0.34 |

TABLE 6

| Example No. | Phorphorous-containing species | Dry Time (seconds) | Flux (gfd) | Salt Passage (percent) |
|---|---|---|---|---|
| 15 (control) | none | 10 | 12.6 | 0.35 |
| 16 | Tri phenyl phosphine | 10 | 17.7 | 0.41 |

TABLE 6-continued

| Example No. | Phorphorous - containing species | Dry Time (seconds) | Flux (gfd) | Salt Passage (percent) |
|---|---|---|---|---|
| 17 | Tri butyl phosphate | 10 | 16.2 | 0.53 |

TABLE 7

| Example No. | Phorphorous - containing species | Dry Time (seconds) | Flux (gfd) | Salt Passage (percent) |
|---|---|---|---|---|
| 18 (control) | none | 10 | 12.0 | 0.38 |
| 19 | Di-tert-butyl diisopropyl Phosphoramidite [(CH$_3$)$_2$CH]$_2$NP [OC(CH$_3$)$_3$]$_2$ | 10 | 16.0 | 0.45 |

TABLE 8

| Example No. | Phorphorous - containing species | Dry Time (seconds) | Flux (gfd) | Salt Passage (percent) |
|---|---|---|---|---|
| 20 (control) | none | 10 | 13.8 | 0.38 |
| 21 | Dibutylbutyl Phosphonate CH$_3$(CH$_2$)$_3$ P(O)[O(CH$_2$)$_3$CH$_3$]$_2$ | 10 | 16.1 | 0.30 |
| 22 | *Tri-octyl phosphine | 10 | 17.5 | 0.39 |

*4:1 stoichiometric ratio of TMC to Tri-octyl phosphine

As shown in the Tables provided above, the addition of the subject phosphorous containing compound to the polyfunctional acyl halide solution improved flux and/or refectopm (e.g., salt passage) of the resulting membranes as compared to control membranes wherein the subject phosphorous containing compounds were not used.

What is claimed is:

1. A method for making a composite membrane comprising the non-sequential steps of coating a porous support with: (i) a solution containing a polyfunctional amine and (ii) a solution containing a polyfunctional acyl halide, wherein the polyfunctional amine and polyfunctional acyl halide are contacted with each other and react to form a polyamide layer on the porous support, the process being characterized by the step of contacting a phosphorous containing compound with the polyfunctional acyl halide prior to the reaction between the polyfunctional acyl halide and polyfunctional amine wherein the phosphorous containing compound has a solubility parameter of from about 15 to about 26 $J^{1/2}$ cm$^{-3/2}$.

2. The method of claim 1 wherein the phosphorous containing compound is contacted with the polyfunctional acyl halide prior to the step of contacting the polyfunctional acyl halide and polyfunctional amine.

3. The method of claim 2 wherein the polyfunctional acyl halide solution comprises from 0.001 to 10 weight volume percent of the phosphorous containing compound.

4. The method of claim 1 wherein the phosphorous containing compound is substantially soluble in the polyfunctional acyl halide solution.

5. The method of claim 1 wherein the phosphorous containing compound has an energy of interaction with the polyfunctional acyl halide of greater than about 4.0 kcal/Mole.

6. The method of claim 1 wherein the phosphorous containing compound is reacted with the polyfunctional acyl halide prior to and/or during the step of contacting the polyfunctional amine and polyfunctional acyl halide such that the resulting polyamide layer comprises a detectable quantity of retained phosphorous.

7. The method of claim 1 wherein the phosphorous containing compound comprises at least one of: phosphates, phosphites, phosphines, phosphine oxides, phosphonates, diphosphonates, phosphinates, phosphinites, phosphonites, pyrophosphates, pyrophosphoramides, phosphor amides, phosphorothionates, phosphorodithionates, and phosphoroamido thionates.

8. The method of claim 1 wherein the phosphorous containing compound comprises a compound represented by the formula:

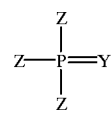

wherein Z is the same or different and is selected from: X, O—P—(X)$_2$, P(O)—X$_2$, (P(—X))$_m$—P—X$_2$, (O—P(—X))$_m$—O—P—X$_2$, (P(O)(—X))$_m$—P(O)—X$_2$, and (O—P(O)(—X))$_m$—O—P(O)—X$_2$; P is phosphorous, O is oxygen, m is an integer from 1 to 5; Y is O or a non-bonded pair of electrons, X is the same or different and is selected from: R and R including one or more oxygen linkage(s), and R is the same or different and is selected from H (hydrogen), and a carbon containing moiety.

9. The method of claim 8 wherein Z is selected from C$_1$–C$_8$ aliphatic groups.

10. The method of claim 8 wherein at least one Z is selected from an aromatic group.

11. The method of claim 8 wherein Y is oxygen and Z is the same or different and is selected from R and R including one or more oxygen linkages; and R is the same or different and is selected from: H and C$_1$–C$_{12}$ containing moiety.

12. The method of claim 11 wherein R is selected from C$_1$–C$_8$ aliphatic groups.

13. The method of claim 11 wherein the phosphorous containing compound comprises a compound represented by the formula:

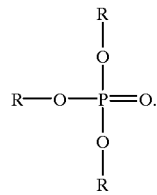

14. The method of claim 13 wherein R is selected from C$_1$–C$_8$ aliphatic groups.

15. The method of claim 13 wherein at least one R is selected from an aromatic group.

16. The method of claim 11 wherein at least one R is selected from an aromatic group.

17. The method of claim 8 wherein Y is a non-bonded pair of electrons and the phosphorous containing compound comprises a compound represented by the formula:

wherein Z is the same or different and is selected from R and R including one or more oxygen linkages; and R is the same or different and is selected from: H and $C_1$–$C_{12}$ containing moiety.

18. The method of claim 17 wherein R is selected from $C_1$–$C_8$ aliphatic groups.

19. The method of claim 17 wherein at least one R is selected from an aromatic group.

20. The method of claim 17 wherein Z is the same or different and is selected from O—R and R.

21. The method of claim 20 wherein R is selected from $C_1$–$C_8$ aliphatic groups.

22. The method of claim 20 wherein at least one R is selected from an aromatic group.

23. The method of claim 1 wherein the polyfunctional amine comprises metaphenylene amine and the polyfunctional acyl halide comprises trimesoyl chloride.

24. The method of claim 23 wherein the polyfunctional amine solution is an aqueous solution and the polyfunctional acyl halide solution is an organic solution.

25. The method of claim 1 wherein the polyamide layer is contacted with a solution containing from 200 to 10,000 ppm of hypochlorite ion at a pH of at least 10.5.

26. The method of claim 25 wherein the polyamide layer is heat treated by contact with water at a temperature of 40° C. to 100° C. before contacting the membrane solution with the containing hypochlorite ion.

27. The method of claim 1 wherein the polyamide layer is contacted with an amine selected from the groups consisting of: ammonia, substituted ammonia, butylamine, cyclohexylamine, and 1,6 hexane diamine.

28. The method of claim 1 wherein the polyamide layer is contacted with a strong mineral acid.

29. A membrane made according to the method of claim 1.

30. A method for making a composite membrane comprising the steps of coating a porous support with an aqueous solution containing a polyfunctional amine followed by subsequently coating an organic solution containing a polyfunctional acyl

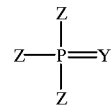

halide such that the polyfunctional amine and polyfunctional acyl halide are contacted with each other and react to form a polyamide layer on the porous support, the process being characterized by the step of including from 0.001 to 10 weight volume percent of a non-pyrophoric phosphorous containing compound within the polyfunctional acyl halide solution, wherein the phosphorous containing compound has a solubility parameter of from about 15 to about 26 $J^{1/2}$ $cm^{-3/2}$, an energy of interaction with the polyfunctional acyl halide of greater than 4.0 kcal/Mole and is represented by the formula:

wherein Z is the same or different and is selected from: X, O—P—$(X)_2$, P(O)—$X_2$, $(P(-X))_m$—P—$X_2$, $(O-P(-X))_m$—O—P—$X_2$, $(P(O)(-X))_m$—P(O)—$X_2$, and $(O-P(O)(-X))_m$—O—P(O)—$X_2$; P is phosphorous, O is oxygen, m is an integer from 1 to 5; Y is O or a non-bonded pair of electrons, X is the same or different and is selected from: R and R including one or more oxygen linkage(s), and R is the same or different and is selected from H (hydrogen), and a $C_1$–$C_{12}$ containing moiety.

* * * * *